(12) United States Patent
Livingston et al.

(10) Patent No.: US 8,521,659 B2
(45) Date of Patent: Aug. 27, 2013

(54) SYSTEMS AND METHODS OF DISCOVERING MIXTURES OF MODELS WITHIN DATA AND PROBABILISTIC CLASSIFICATION OF DATA ACCORDING TO THE MODEL MIXTURE

(75) Inventors: Mark Alan Livingston, Alexandria, VA (US); Aditya Maruti Palepu, Oakton, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1022 days.

(21) Appl. No.: 12/541,857

(22) Filed: Aug. 14, 2009

(65) Prior Publication Data
US 2010/0042563 A1  Feb. 18, 2010

Related U.S. Application Data

(60) Provisional application No. 61/088,830, filed on Aug. 14, 2008.

(51) Int. Cl.
| | |
|---|---|
| *G06F 15/18* | (2006.01) |
| *G06F 1/02* | (2006.01) |
| *G06F 17/10* | (2006.01) |
| *G06N 7/02* | (2006.01) |

(52) U.S. Cl.
USPC .................... 706/12; 706/52; 708/270; 703/2

(58) Field of Classification Search
None
See application file for complete search history.

(56) References Cited

U.S. PATENT DOCUMENTS

2010/0323903 A1 * 12/2010 Rosenwald et al. .............. 506/7

OTHER PUBLICATIONS

Torr, Zisserman, "MLESAC: A New Robust Estimator with Application to Estimating Image Geometry", Computer Vision and Image Understanding, vol. 78, 2000, pp. 138-156.*
Castro, Lee, "AUTOCLUST: Automatic Clustering via Boundary Extraction for Minnig Massive Point-Data Sets", Proceedings of the 5th International Conference on GeoComputation, University of Greewich, UK, 2000, pp. 1-20.*
Schnabel, Wahl, Klein, "Efficient RANSAC for Point-Cloud Shape Dectection", Computer Graphics Foreuem, vol. 26:2, Jun. 2007, pp. 214-226.*
Goshen, Shimshonl, "Guided Sampling via Weak Motion Models and Outlier Sample Generation for Epipolar Geometry Estimation", International Journal of Computer Vision, vol. 80, 2008, pp. 275-288.*

* cited by examiner

*Primary Examiner* — Kakali Chaki
*Assistant Examiner* — Walter Hanchak
(74) *Attorney, Agent, or Firm* — Amy L. Ressing; John L. Young

(57) ABSTRACT

Discovering mixtures of models includes: initiating learning algorithms, determining, data sets including a cluster of points in a first region of a domain and a set of points distributed near a first line extending across the domain; inferencing parameters from the cluster and the set of points; creating a description of the cluster of points in the first region of the domain and computing approximations of a first learned mixture model and a second learned mixture model; determining a first and second probability, generating a confidence rating that each point of the cluster of points in the first region of the domain corresponds to the first learned mixture model and generating a confidence rating that each point of the set of points distributed near the first line correspond to the second learned mixture model, thus causing determinations of behavior of a system described by the learned mixture models.

16 Claims, 12 Drawing Sheets

SYSTEMS AND METHODS OF DISCOVERING MIXTURES OF MODELS WITHIN DATA AND PROBABILISTIC CLASSIFICATION OF DATA ACCORDING TO THE MODEL MIXTURE

RELATED APPLICATIONS

The present application is related to and claims the benefit of priority under 35 USC §119(e) of prior filed provisional U.S. patent application 61/088,830, which is herein incorporated by reference in its entirety.

FIELD OF THE INVENTION

The present application generally relates to machine learning, data mining and to mathematical modeling in business, science, educational, legal, medical and/or military environments. More particularly, the present application relates to training mathematical models that describe a given data set and classify each point in the data with a probability of fitting each discovered model for the purpose of discovering a model from existing data.

BACKGROUND OF THE INVENTION

The amount of data currently available overwhelms our capacity to perform analysis. Thus, good tools to sort through data and determine which variables are relevant and what trends or patterns exist amongst those variables becomes a paramount initial step in analyzing real-world data. In defense and security applications, the consequences of missed information can be dire.

Mixture models are the generic term given to models that consist of the combination (usually a summation) of multiple, independent functions that contribute to the distribution of points within a set. For example, a mixture model might be applied to a financial market, with each model describing a certain sector of the market, or each model describing behavior of the market under certain economic conditions. The underlying mechanism that creates the overall behavior of the system is often not directly observable, but may be inferred from measurements of the data. Also, a combination of models may be used simply for convenience and mathematical simplicity, without regard to whether it accurately reflects the underlying system behavior.

General mixture models (GMM) have been successfully applied in a wide range of applications, from financial to scientific. However, exemplary embodiments include applications having militarily-relevant tasks such as tracking and prediction of military tactics. Implementation of such militarily-relevant tasks necessitates extension of standard techniques to include a wider range of basis models, a more flexible classification algorithm that enables multiple hypotheses to be pursued along with a confidence metric for the inclusion of a data point into each candidate model in the mixture (a novel contribution in this work), the application of standard techniques for pushing the GMM solver out of a local optimum in the search for a global solution, and parallel implementations of these techniques in order to reduce the computation time necessary to arrive at these solutions. Further exemplary embodiments include domain expertise metrics and techniques for dimension reduction, which are necessary processes in dealing with real world problems, such as searching for patterns in enemy tactics, such as IED emplacements and suicide attacks.

Overlapping fields such as unsupervised machine learning, pattern classification, signal processing, and data mining also offer methods, including: principal component analysis (PCA), independent component analysis (ICA), k-means clustering, and many others all of which attempt to extract models that describe the data.

PCA transforms the basis of the domain so that each (ordered) dimension accounts for as much variability as possible. Solutions often use eigenvalue or singular value decomposition. Concerns include the assumption of a linear combination, computational expense, and sensitivity to noise and outliers.

In regard to ICA limitations, ICA assumes mutual statistical independence of source signals; and ICA can not identify actual numbers of source signals; also, ICA does not work well in high dimensions. ICA separates a multivariate signal into a summation of components. It identifies these by maximizing the statistical independence, often by a measure non-fit to a Gaussian model. It typically requires a centering, whitening, and dimension reduction to decrease the complexity of the problem; the latter two are often accomplished by using PCA. ICA can not in general identify the number of source signals. ICA solutions can be non-unique in the ordering of components, and the scale (including sign) of the source signals may not be properly identified.

However, ICA identifies summed components by maximizing the statistical independence. k-means finds a pre-specified number of clusters by minimizing the sum of variances within each cluster. The solution as specified by cluster indicators has equivalence to PCA components. Further ICA concerns include having to know the number of clusters, assumptions of Gaussian clustering, and reliance on good seed points. FlexMix methods allow finite mixtures of linear regression models (Gaussian and exponential distributions) and an extendable infrastructure. To reduce the parameter space, FlexMix methods restrict some parameters from varying or restrict the variance. FlexMix methods assume the number of components is known, but allow component removal for vanishing probabilities, which reduces the problems caused by overfitting, and provides two methods for unsupervised learning of Gaussian clusters: one method is a "decorrelated k-means" algorithm that minimizes an objective function of error and decorrelation for a fixed number of clusters, and the second method is a "sum of parts" algorithm that uses expectation maximization to learn the parameters of a mixture of Gaussians and factor them.

Learning models from unstructured data have a wide range of fields of application, and thus learning models comprise a well-studied problem. The fundamental approach is to assume a situation in which an underlying mechanism, which may or may not be observable, generates data such that each observation belongs to one of some number of different sources or categories. More generally, such models may be applied indirectly to generate a model that fits, even if the underlying model is known to be different than the components used.

Gaussian mixture models are used for classifying points into clusters that enable an analyst to extract the underlying model or models which produced a set of observations. For simple situations, this technique may be used to easily separate the data into clusters that belong to a particular model. Referring to FIG. 1A, FIG. 1B and FIG. 1C, the images in FIG. 1 represent a contrived example of one such case where three models are easily identified. The image in FIG. 1B offers no clear component models and would be difficult to automatically classify. The image in FIG. 1C appears to depict separate component models, but still some outlying data points that do not fit at all and some points that could be in either of two clusters. This case in FIG. 1C is much more realistic than the other two models.

It should be noted that while a Gaussian function is a common basis function, there is nothing in the theory that prevents linear, quadratic, transcendental, or other basis functions from being considered as possible components, and indeed such models are being used in learning of general mixture models (GMM). The difficulty that arises in such cases is that the combinatorial explosion of possibilities becomes computationally problematic.

There are several methods used to estimate the mixture in GMM. The most common is expectation maximization (EM), which iteratively computes the model parameters and their weights, as well as assesses the fit of the mixture model to a plurality of data. Thus the first step at each iteration computes the "expected" classes of all data points, while the second step computes the maximum likelihood model parameters given the class member distributions of the plurality of data. The first step requires evaluation of the Gaussian or other basis function; the second is a traditional model-fitting operation. The nice thing about EM is that convergence is guaranteed, but only to a local optimum, which means that the algorithm may not find the best solution. This convergence is achieved in a linear fashion.

Utilization of the EM approach highlights another problem with the general mixture model approach, regardless of the basis functions included, is that the methods inherently must assign each data point to a particular basis model; there is no room for uncertainty associated with this assignment, though it inherently exists within the data. Also, EM is sensitive to errors in the class assignment, introducing the possibility of missing the introduction of a new model into the mixture when new data doesn't quite fit. Multiple hypotheses can not both claim to draw upon a single data point, which means that one of the hypotheses must be eliminated from consideration early in the process.

Therefore, the need exists for estimating the mixtures, which eliminates problems with the general mixture model approach of uncertainty of data point assignment associated with this assignment, though it inherently exists within the data.

Also, the need exists for reducing sensitivity to errors in the class assignment, which introduces the possibility of missing the introduction of a new model into the mixture when new data doesn't quite fit.

The need exists for a more pro-active defense posture in the assessment of threats against U.S. forces and installations in battlefields and other high-risk environments.

Furthermore, the need exists for threat assessment applications including militarily-relevant tasks such as tracking and prediction of military tactics, having a wider range of basis models, a more flexible classification algorithm that enables multiple hypotheses to be pursued along with a confidence metric for the inclusion of a data point into each candidate model in the mixture, the application of standard techniques for pushing the GMM solver out of a local optimum in the search for a global solution, and parallel implementations of these techniques in order to reduce the computation time necessary to arrive at these solutions.

Further, the need exists for applying a sampling technique such as the random sample consensus (RANSAC) method to classification procedures. By testing every data point against each proposed model to compose the mixture, a measure of the uncertainty can be obtained associated with a particular assignment, derived from the residual error associated with each model. A data point may thus be associated tentatively with any number of models until such time as the confidence in a particular component model becomes high enough to truly classify the data point into a particular pattern. In this way, a decision may be delayed until multiple hypotheses have had a chance to claim a data point.

Additionally, the need exists for embodiments which include domain expertise metrics and techniques for dimension reduction, which are necessary processes in dealing with real world problems, such as searching for patterns in enemy tactics, such as IED emplacement and suicide attacks.

Still further, the need exists for methods of extracting models that describe the data, which reduce concerns including the assumption of a linear combination, computational expense, and sensitivity to noise and outliers.

Furthermore, the need exists for methods of overcoming ICA limitations of the inability of identifying actual numbers of source signals; also, ICA does not work well in high dimensions, and typically requires a centering, whitening, and dimension reduction to decrease the complexity of the problem; the latter two are often accomplished by using PCA.

Further, the need exists for methods of identifying the number of source signals.

Additionally, the need exists for methods of estimating mixtures in GMM which do not suffer from combinatorial explosion of possibilities that are computationally problematic.

In addition, the need exists for applying a standard method simulated annealing for dealing with the problem of the possibility of getting stuck in a local minimum, which is a general problem in optimization methods. Simulated annealing probes the search space with a random jump to see if the current neighborhood of the search seems not as promising as the tested location. If the probe sees a lower cost (goodness of fit, in this case), then the jump is accepted and the search continued. While there are no guarantees, with such a large search space of possible models and parameters of those models, this is an important element in any algorithm for delivering a GMM for the observed data in a tracking or event prediction model.

Further, the need exists for managing the computational load inherent in the multiple models being evaluated, thus parallel architectures of modern graphics processing units (GPUs) will be applied to the problems at issue. Such units have proven themselves to be applicable to a wide range of repetitive computations, especially those with gridded problems or that exist (as these models will) within well-defined domains like the search spaces in the problems described above. Thus evaluation of multiple points on a model in a single step is possible, by applying a single program—multiple data parallel computation approach. This reduces the cost of each additional model that is a candidate for the mixture to a constant factor, although the model may still require a complex program for individual evaluation. The number of data points, however, becomes less of a factor in the asymptotic evaluation of the program efficiency.

Also, the need exists for risk averse measures, such as confidence metrics, both in the fit to a particular model and through the multiple-hypothesis capability by enabling a data point to be classified into multiple models in the mixture, in order to minimize risk of this research, as with any optimization method, because there is no way to guarantee 100 percent accuracy in the results.

Furthermore, the need exists for understanding the tactics used by enemy combatants, especially in the era of asymmetric warfare. The danger presented by IED emplacements and suicide attacks is extremely high. While no prediction algorithm can be expected to be 100 percent accurate in identifying dangers as they approach or excluding non-combatants from suspicion, there are patterns to this behavior. Thus detecting patterns that can be learned from existing data and applying them to situations in which the threat must be assessed is a critical problem for combat environments. Similar problems may be considered in maritime domain awareness, homeland security, and other safety and security applications.

SUMMARY OF THE INVENTION

A computer implemented method of discovering mixtures of models within data and probabilistic classification of data according to model mixtures includes: receiving, a request for discovering mixtures of models within data and probabilistic classification of data according to model mixtures; initiating a learning algorithm, by the computer processor, causing the computer processor to execute the computer readable and executable program discovering mixtures of models within data and probabilistic classification of data according to mixture models; applying a random sampling operation to determine mathematical functions by determining, by the computer processor, when a data set consists of a cluster of points in a first region of a domain, determining one of when a set of points distributed near a first line that extends across some part of the domain exists and determining when a set of points constitutes one of a transcendental, hyperbolic, polynomial and other mathematical function, which is described as embedded in any number of dimensions that describe input data and any other type of function that extends across any number of dimensions of the domain exists; inferencing parameters, of the first line, that either describe the set of points distributed near the first line, or that describe a mean and variance of the cluster of points in the first region of the domain creating either a description of the cluster of points in the first region of the domain or other parameters that describe an instance of a function in an appropriate number of dimensions; computing approximations of a first learned mixture model corresponding to the set of points distributed near the first function and a second learned mixture model corresponding to the set of points near the second function within the domain, and similar approximations for any number of functions as determined to exist within the data in any subspace of the domain and the entire domain; determining multiple models of the plurality of models that fit portions of mixture models of the plurality of models by probabilistically assigning points to multiple models of the plurality of models by determining a first probability that the first learned mixture model corresponds to each point of the cluster of points in the first region of the domain and determining a second probability that the second learned mixture model corresponds to each point of the set of points distributed near the first line, wherein determining the first and second probabilities is performed by testing each point, wherein determining the first and second probabilities eliminates a requirement for a fit of each point displaced from a true position, and wherein setting a minimum number of points for each of the first and second learned mixture models distinguishes the first and second learned mixture models from a combination learned mixture model formed from parameters of the first and second learned mixture models, and repeating for each of any number of functions (models in the mixture) that may be determined to exist within the data; using abstractions of mathematical functions to form simulated equivalent mathematical functions, causing one or more mathematical functions to be processed as one or more of the plurality of models; comparing different mathematical functions, using geometric properties, including overlap, supporting point sets, and density; providing user settable thresholds for user interaction with computations of residual error and corresponding and supporting point sets to learned mixture models and generating a confidence rating that each point of the cluster of points in the first region of the domain corresponds to the first learned mixture model and generating a confidence rating that each point of the cluster of points in the first region of the domain correspond to the second learned mixture model and causing determination of a behavior of a system described by the learned mixture models, and repeating for any number of functions that are determined to exist within the data.

BRIEF DESCRIPTION OF THE DRAWINGS

FIG. 2 can also be characterized as illustrating an example of a Gaussian blob (with unequal variances in the two dimensions) being learned along with two lines.

DETAILED DESCRIPTION OF THE INVENTION

Figure 1A:
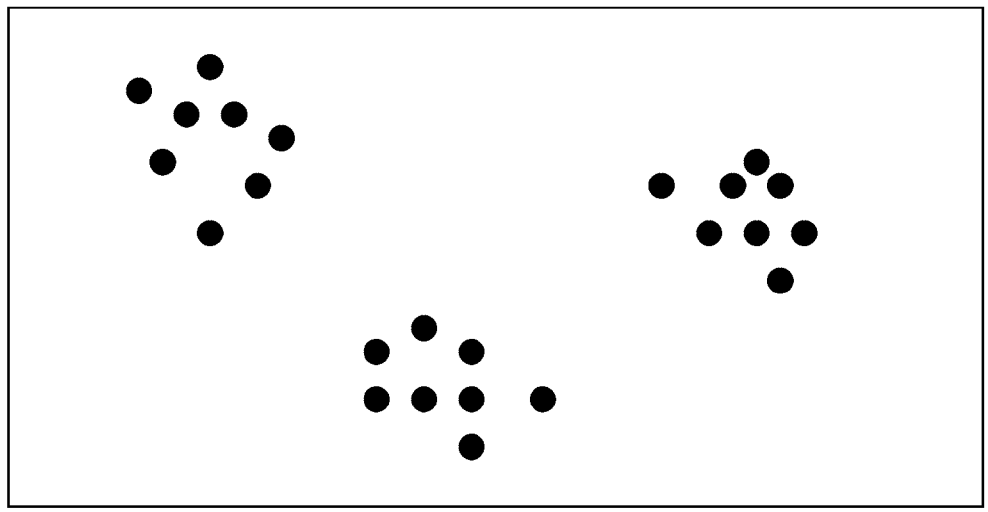
FIG. 1A illustrates Gaussian mixture models representing a case where three models are easily identified.

Preferred exemplary embodiments of the present disclosure are now described with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that this invention can also be employed in other applications. Devices and components described in the exemplary embodiments can be off the shelf commercially available devices or specially made devices. Further, the terms "a", "an", "first", "second", and "third" etc. used herein do not denote limitations of quantity, but rather denote the presence of one or more of the referenced items(s).

In an exemplary embodiment, of particular interest is the discovery of potential models that may describe the underlying processes that generate data. Typically, the mechanisms that create the overall behavior are not directly observable, but may be inferred from measurements. The extracted models may then be used to draw insights about the events encapsulated in the data. Another issue of great interest is the use of such models as tools for prediction or assessment of likelihood of future events.

The purpose of the application is to discover mathematical models that describe a given data set and classify each point in the data with a probability of fitting each discovered model. A model may be any mathematical shape, including but not limited to lines, closed curves, geometric shapes, or general functions such as Gaussians, polynomials, exponentials, or trancendentals, or combinations of any of the above. Once a set of models (from one to any number) is determined to fit in the data set, a probability may be assigned to each data point to measure the likelihood that a given point "belongs to" a particular function—i.e. that it is consistent with that particular model. From these probabilities, a classification of the points may be derived.

Risks inherent in optimization research include the understanding that approaches to optimization research can only be as good as the data on which optimization research is evaluated. However, in this application, real data for the IED attacks and terrorist events in the Middle East are utilized. Also, real crime data available for local U.S. jurisdictions is used to exercise the modeling algorithm, so there are several sources of good data used.

This application develops a new framework for unsupervised learning that addresses shortcomings associated with existing methods. An object oriented approach is taken to design a model. Fundamental operations identified include construction of a model from a list of points and the computation of residual error for a point, given the model parameters. This approach provides a way to build a model with a randomly selected set of data points and to compute an optimal approximation, such as computation of a least squares optimal approximation or some other known optimal approximation paradigm, according to standard mathematical practices, from a set of points identified as probabilistically belonging with that model, and re-compute the residuals for all points. The computation of a residual has a somewhat different meaning for every class of function, but for many functions the computation of a residual is merely an abstraction of a distance function with geometric meaning in the space. For functions such as Gaussians, the natural residual associated with such a function (the Z-score) is a convenient implementation. Implicitly, there is a metric for whether a particular value of the residual is deemed sufficiently close to an instance to warrant inclusion. Thus every function must have a way—given access to the input data—to build a random instance of itself, compute residuals to its current instance, evaluate which points are worthy of further consideration, and build optimal approximations from those points.

Algorithms used build on the RANSAC framework for estimation of good candidate models. However, in exemplary embodiments, algorithms are altered in important (but simple) ways. Not just one answer, but the best answer is sought (by any metric); also, reasonable models are generated which are candidate hypotheses for the underlying cause(s) behind the input data. Thus, an internal list of candidates (via a priority queue) are maintained, rather than a single candidate. Then models are generated iteratively at random, and their quality is assessed, and compared against other models previously generated. The lowest quality candidate among the current set may be discarded when a better candidate is discovered.

In exemplary embodiments, an analogous change in the stopping conditions for RANSAC is made. The original specification included two criteria: a maximum number of attempts to find the best model and a minimum amount of support required. The first criterion is maintained: the number of models tested is limited (but multiple possible solutions are kept). The second criterion requires some adjustment, since multiple underlying models are responsible for the data. Thus the number of points are counted that are supporting at least one candidate model to determine whether a sufficient portion of the data has been modeled. It is important to note that a point supporting two completely independent models is not prevented. This requires some global accounting to ensure that points are not counted multiple times when determining how many points in the data are modeled by the candidate functions.

Figure 1B:
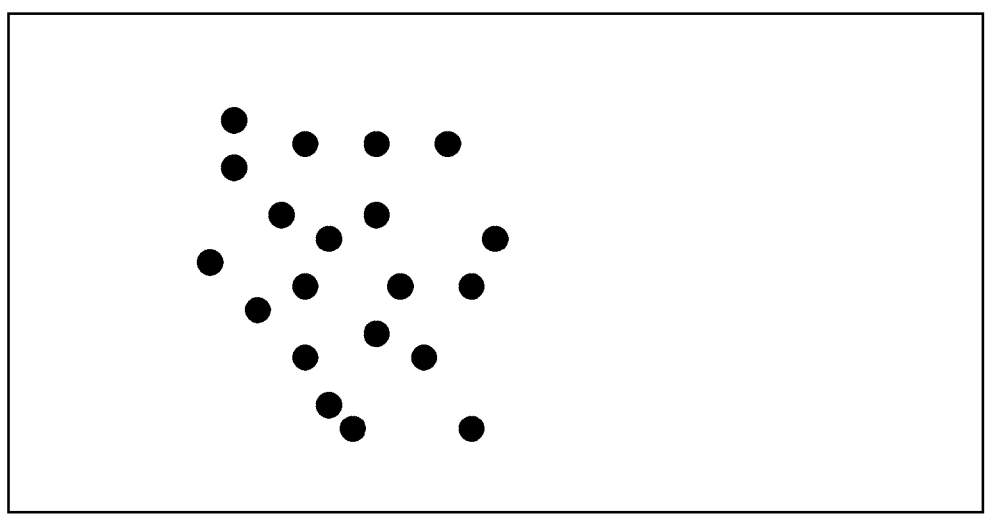
FIG. 1B illustrates Gaussian mixture models representing no clear component models.
Figure 1C:
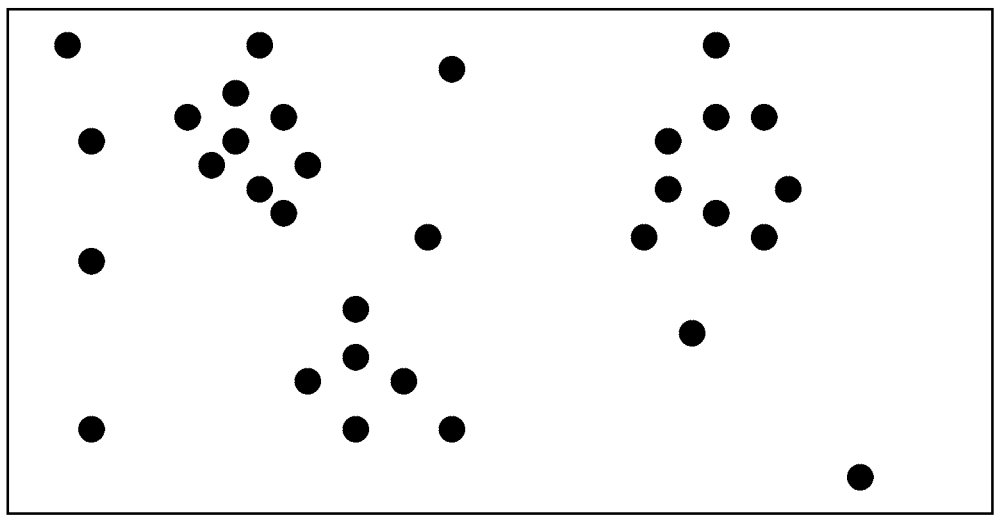
FIG. 1C illustrates Gaussian mixture models representing separate component models with outlying points.

To complete the implementation, a way to compare the quality of one model to another is needed. This is much more straightforward for models of the same type, and thus one loop for each type of model is selected (see FIG. 1A, FIG. 1B and FIG. 1C). Evaluations for models which are too similar to previously accepted models are aborted. A parameter for the acceptable amount of overlap and geometric measures of similarity such as distance between functions or area of overlap would need to be developed and rigorously analyzed. As the number of models in a library grows, this will become an inefficient method. With just two basic function types initially implemented, this suffices and yields a basis for considering appropriate metrics for comparing fundamentally different models.

Two metrics inherent in the RANSAC framework provide a basis for comparing models. Mean residuals for models are examined, as the first criterion. If these are quite close (a few points difference as a percentage of the domain's size), then the support size for an individual model is examined. Candidates with significantly greater numbers of points within the maximum residual are considered to be better candidates; these are kept in the candidate set for further consideration. While nothing in this framework would prevent comparisons of mean residuals for models of different types, this is not currently done, since the geometric validity of such comparisons has not been determined. Within this framework, linear and Gaussian models are implemented, as the second criterion. These metrics will be extended.

In exemplary embodiments, a final mixed model has a residual for each point against each of the component models. This serves two purposes. First, it gives us fuzzy assignment of every point in the original data to each of the models in the final candidate set. This allows a point to support multiple models and demonstrate that multiple hypotheses might explain a particular data point. Second, it enables identification of outlier points that are not explained by any of the candidate models. Parameters are identified through which a user may control the performance of the algorithm. Typically, a minimum amount of support for a model is enforced to be considered valid. This prevents generation of an extremely high number of models and increases the likelihood that the models generated will be meaningful. However, raising this number too high can force the algorithm to miss a valid model that explains a smaller number of points.

Current algorithms use variance and statistical independence metrics. In exemplary embodiments, metrics are more intuitive for non-experts in statistics (like GIS analysts). Comparisons against current methods are conducted, using various datasets. New metrics for such comparisons are herein described. Speed improvements are also important; similar algorithms have seen performance gains commensurate with the degree of parallelism, which is currently as high as 128 for graphics hardware. (Some minor overhead reduces the gain).

Figure 2:
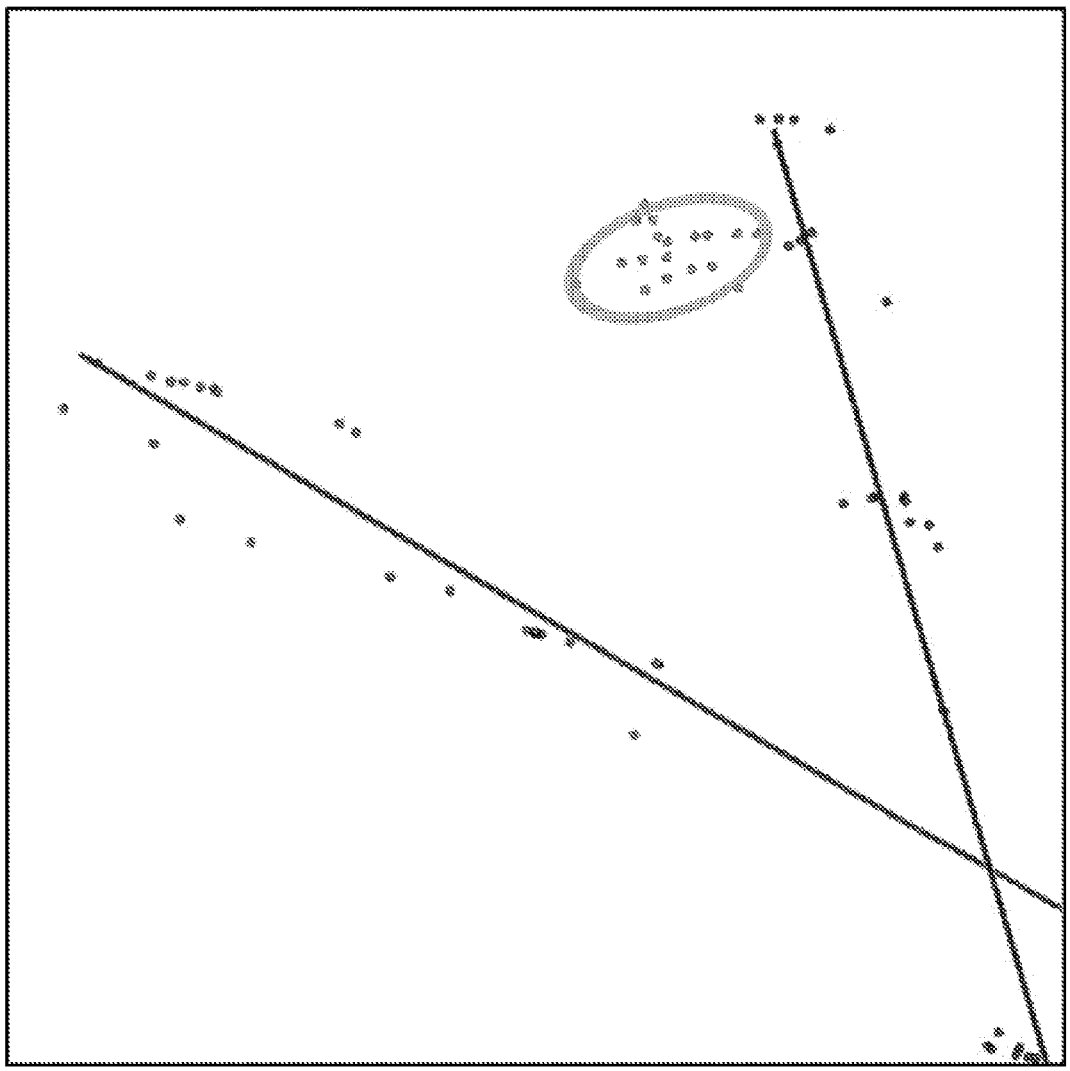
FIG. 2 illustrates a mixture of lines with Gaussian clusters in synthetic data.

In exemplary embodiments, referring to FIG. 2, executing the algorithm for discovering mixtures of models within data and probabilistic classification of data according to the model mixture on synthetic data demonstrates the robustness of the algorithm in regard to intersection of models and to wide distributions of coherent groups (see FIG. 2). The algorithm for discovering mixtures of models within data and probabilistic classification of data according to the model mixture determines a reasonable classification of the points into three groups. Note that the wide, uneven distribution of the group depicted in FIG. 2 at about 105 degrees across the group depicted in FIG. 2 at about 150 degrees line poses no problem, nor does the nearness of the oval group cluster to the red line. (Fuzzy classification is computed.) One classic data set to which this sort of unsupervised learning may be applied is the Fisher iris data.

Figure 3:
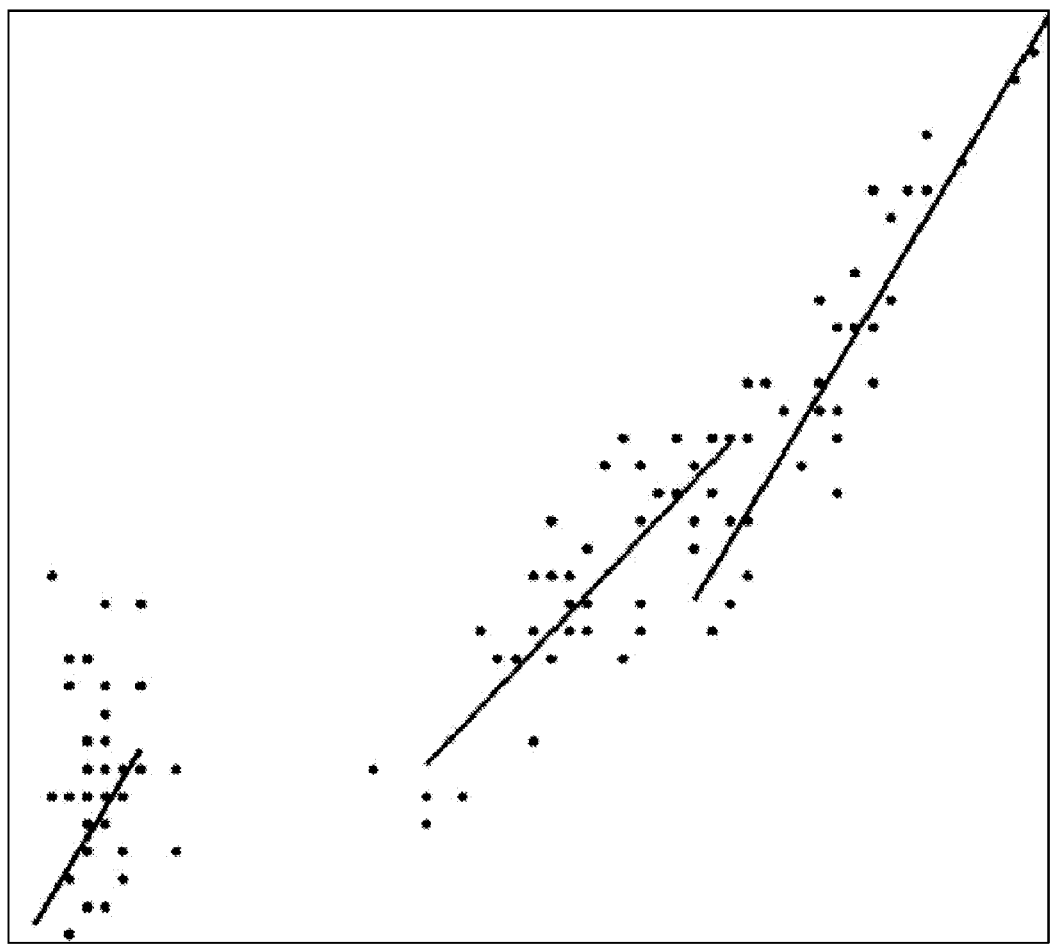
FIG. 3 illustrates a mixture of lines with Gaussian clusters.

Referring to FIG. 3, the algorithm for discovering mixtures of models within data and probabilistic classification of data according to the model mixture correctly groups the setosa points (i.e., points on the 105 degree line in FIG. 3) group and gives a reasonable fuzzy classification of the versicolor (i.e., the top cluster in FIG. 3) and virginica (i.e., the middle cluster in FIG. 3) classes. In a region of overlap, where probabilities could be nearly equal for input points, an analyst would need to apply other information and/or human intelligence to draw inferences. (Improved visualization tools are being developed under separate, ongoing research in our group.

A larger model library is one extension of the current implementation. Integrating the model generation into a single loop which at random tests any function type for inclusion as a model requires equating the geometric meaning of a residual of each type. An exponential decay function of the distance from a geometric model to compare against the Gaussian model is used. Improved efficiency in both computation and memory are implemented. One important property of the algorithm is that generating models does not require mapping the points to a new space; thus only one copy of the input data is ever required.

The expanded model library and integrated loop in turn require improved metrics for comparing models. In exemplary embodiments a separate loop for each model type is implemented. With only two, this is a minor inconvenience; with more, this will be a source of inefficiency. Current metrics include the number of points that support a model and the mean residual for those points. In practice, the number of points is determined, that is, for the number of points that do not yet support a model. This provides a multi-key priority queue for pruning models from our list of candidates. Requiring many unique points implies that fewer candidate models will be proposed; this may be an advantage or disadvantage to a user. Also the equivalence of the mean residual metric must be maintained. Distance and z-score are both valid, but not necessarily in the same space. Density and bounding volume overlap are not limited by the space in which each is defined.

Of critical interest is implementation of intuitive control parameters for the analyst; a recent JASON study identified this as a critical element of all stages of the data pipeline. As noted above, the number of (unique) points required to accept a model is one control mechanism that could be passed on to the human operator. Automated methods for computing the best value could be developed based on the current number of unlabeled points. In exemplary embodiments, control parameters that set thresholds for the residuals are enabled. Also, the analyst is enabled to affect the weighting between these two keys; a mechanism that sets the threshold for how much higher a mean residual can be to win over a lower residual. Although the algorithm does not require any initial input, the algorithm is adaptable to enable input models based on previously observed data.

In exemplary embodiments, the algorithm for discovering mixtures of models within data and probabilistic classification of data according to the model mixture addresses practical issues of robustness to outliers, noise, and missing information. The last leads to concerns of overfitting and underfitting and sensitivity of the extracted models to new data points. The algorithm's metrics enable it to limit these concerns. An important theoretical concern is identifiability and uniqueness of the solution; in complex real-world data sets, a given solution will not in fact be unique. Thus a goal of the algorithm allows multiple, independent, competing hypotheses to emerge. The affect of the overlap parameter directly affects the ability of the algorithm to consider non-unique solutions. The key issue is balancing the two metrics of overlap in support and residual; an automated method of determining this balance is developed. In this respect, a hybrid algorithm with PCA or ICA would be of great value in determining the nature of such an overlap. Determining whether the right number of models has been found is important to the robustness of the algorithm. Also an analysis of the theoretical asymptotic performance of the algorithm is performed, as well as measuring such performance with real and synthetic data sets are implemented in the exemplary embodiments.

Exemplary embodiments include forming hybrids of the various algorithms with the algorithm for discovering mixtures of models within data and probabilistic classification of data according to the model mixture. The value of reducing dimensions is certainly applicable to any algorithm that attempts to mine data for underlying causative models; it guides this algorithm to more efficient searching. Many operations in this algorithm (as well as in PCA, ICA, and k-means are easily parallelizable. Thus, parallel architectures available on graphics processors to provide significant performance improvements are implemented in the exemplary embodiments. These improvements apply not only to this algorithm, but to the components of the other algorithms as well. Many of these other algorithms are computationally expensive (depending on the input data and/or the input parameters), but have many parallel sub-routines. Thus, in exemplary embodiments, double-precision graphics processors are implemented and allow implementation of memory coherence and parallel nature of operations, which rely heavily on matrix and vector computations (which are the basic operations for graphics processors as well).

In exemplary embodiments, the learning algorithm for discovering mixtures of models within data and probabilistic classification of data according to the model mixture is used for evaluations against other clustering and classification algorithms: PCA, ICA, and k-means. Metrics are required to compare such algorithms, since they are not quite identical in nature. One metric is the number of components required to capture a specified percentage of the information in the data. PCA does this cleanly through its ordering of dimensions. The variance captured in those dimensions provides a suitable metric. Similarly, for ICA, the independence of the components gives a basis for determining the information gained by including another component. Both k-means and this algorithm use residual errors; however, the equivalence of k-means and PCA are used to convert the former's metric. Such a transformation is adapted and applied to non-Gaussian groupings for evaluating this algorithm. Also ordering of models inherent in this algorithm can be used to determine the increase in the mean residual incurred by discarding a model; this would more directly equate to the PCA and ICA methods. This discussion also emphasizes the applicability of all of these algorithms to developing a sparse data representation and reducing the number of dimensions, wherein performance limitations of this algorithm is identified.

In exemplary embodiments, the following datasets are used for testing: Because applications of the techniques described in regard to the use of the algorithm for discovering mixtures of models within data and probabilistic classification of data according to the model mixture, any data will be useful for testing. For development, synthetic data as well as classic data sets from the UCI MACHINE LEARNING REPOSITORY, {http://archive.ics.uci.edu/ml/} is used. U.S. CENSUS data and Washington, D.C. crime statistics are used. ARC/GIS software and associated data are used. The {IEEE} SYMPOSIUM ON VISUAL ANALYTICS SCIENCE AND TECHNOLOGY CHALLENGE {http://www.cs.umd.edu/hcil/VASTchallenge09} provides test data and ground truth. Unclassified version of the ONI MERCHANT SHIP CHARACTERISTIC DATABASE, as well as NRL classified data facilities are used, as well.

The algorithm for discovering mixtures of models within data and probabilistic classification of data according to the model mixture extracts a sparse representation of input data by distilling from samples a small number of functions considered for further analysis. This approach differs from those that attempt to find a new basis set of dimensions or select some number of the original dimensions, but it offers many of the same benefits. Note that in the description above, there is nothing that restricts the algorithm to any number of dimensions. The algorithm is able to operate and does freely operate in a lower-dimensional subspace of the input domain, and in doing so, it implicitly selects dimensions that are of great interest; however, such a goal would constrain the options of the algorithm unnecessarily. The algorithm directly finds a few functions that explain the recognizable patterns within the data, pulling out a sparse set of functions that serves the purpose of the algorithm.

Ongoing work in the NRL Information Technology Division involves the use of GIS data for predictive analytics: determination of probability of future events in areas of ongoing conflict. Initial products are in use by DoD and DHS clients. This algorithm in conjunction with GIS analysts is a tool for mining vast data, and tests on proxy data sets from non-sensitive (different region or older) scenarios as well. This algorithm is useful in analysis of merchant ship data from ONI, applicable to pressing problems in the area of maritime domain awareness. Other data sets can be tested with this algorithm as opportunities arise for formal evaluation, in both qualitative and quantitative methods; some of that work was performed for ONR 311 on graphics systems (augmented reality).

In exemplary embodiments, when a data set consists of a cluster of points in one region of a domain, and a set of points distributed near a line that extends across the domain. A mixture model would operate to discover the best parameters of the line that would describe the latter points and the mean and variance of the cluster to describe the former points. Since in a general data set, these points will have displacement from true positions due to noise, and there will in general be noisy points that do not appear to fit either of these models, best fit approximations to the models must be computed. Then, each point may be tested against the two models to determine the probability that each model could be the underlying mechanism that generated that point. This gives a confidence rating that a point belongs to each learned model.

Figure 4:
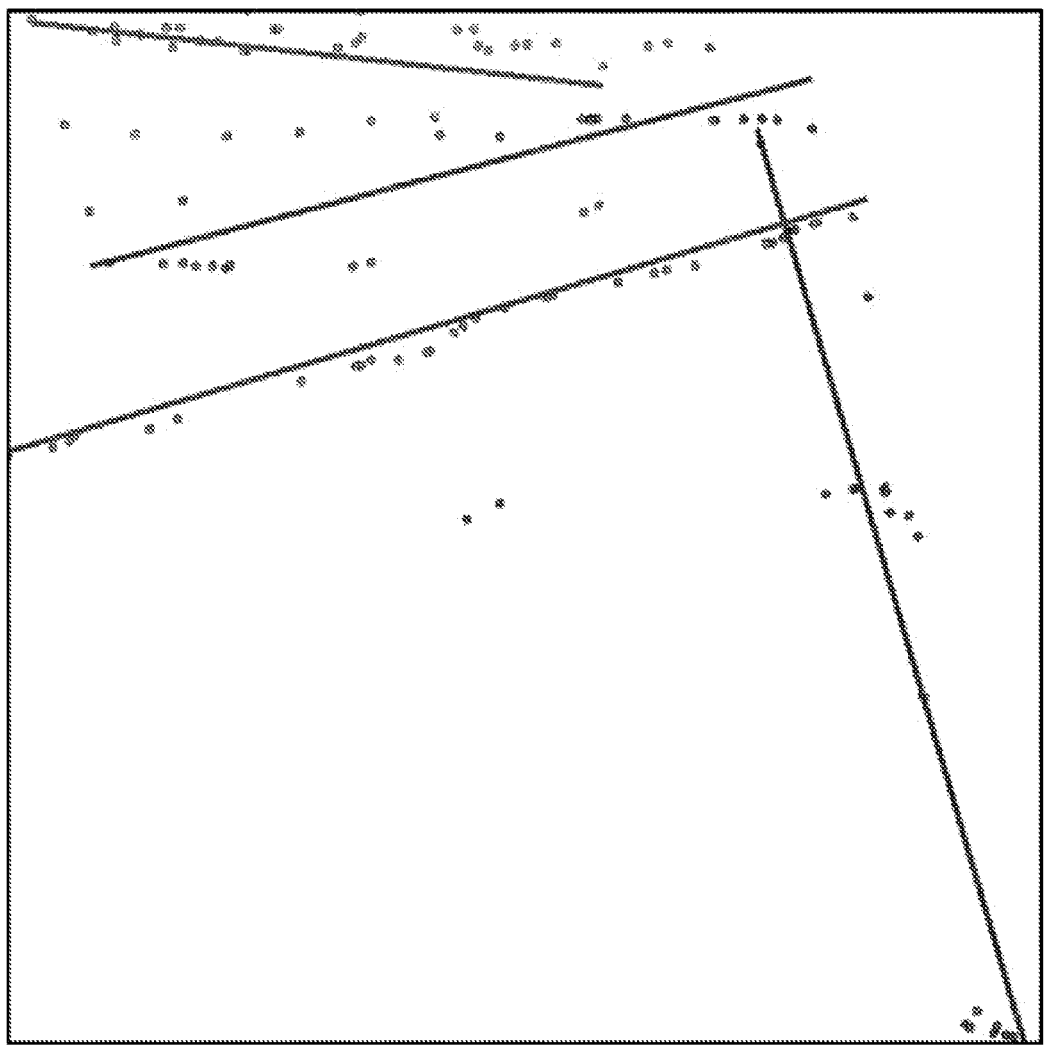
FIG. 4 illustrates where a set of data points have been found to fit reasonably well along a set of four lines.

Referring to FIG. 2 and FIG. 4, in exemplary embodiments, it can be seen that in FIG. 4, a set of data points has been found to fit reasonably well along a set of four lines. This is a simple example of a relatively clean data set, but there are some difficult cases even within this simple example. Note the two points near the middle of the domain, which are not classified as fitting any model. By allowing a probabilistic fit of each point to each model, the algorithmic operations of the algorithm for discovering mixtures of models within data and probabilistic classification of data according to the model mixture does not insist that these points be made to fit. Also, since the algorithm sets a minimum amount of support (such as a number of points) for each selected model, these two points can not form their own model. Another interesting case may be seen near the top end of the setosa class red line (that is the line forming an angle of approximately 105 degrees). As the line forming 105 degrees crosses the bottom line (i.e., the versicolor class blue line), there is an ambiguity among certain points; these points could fit either the line forming the angle of approximately 105 degrees (i.e., the setosa class red line) or the bottom line (i.e., the versicolor class blue line). The algorithmic operations of the algorithm for discovering mixtures of models within data and probabilistic classification of data according to the model mixture can accommodate this ambiguous case by assigning, in exemplary embodiments, a 50 percent probability for these points for each line (i.e., the bottom line and the line forming the angle of approximately 105 degrees). The precise probability for each model would depend on the fit to each model— i.e. on the residual error (distance from a line or a general open or closed curve, statistical z-score for a Gaussian, etc.). Additionally, in exemplary embodiments, the algorithm probabilistically determines whether a series of Gaussians would be more appropriate for the points associated with the line forming the angle of approximately 105 degrees (i.e., the setosa class red points, i.e., the setosa points associated with the setosa class red line) than a single line. The algorithm determines this by the combination of the number of points to support a model before it can be accepted (which in this case was sufficiently high to favor a single line) and the average residual (which nearly caused the points near the bottom of the setosa class red line (i. e., the line forming the angle of approximately 105degree) to be excluded). No other method and or algorithm has such flexibility. The image in FIG. 2 illustrates an example of a Gaussian blob (with unequal variances in the two dimensions) being learned along with two lines. This algorithm is sufficiently flexible to handle this case, which is not a property of existing methods. Previous methods have some number of the following shortcomings. Many existing methods of machine learning must be told the number of underlying models. If this number is incorrect, the computations are guaranteed to come up with inaccurate assessment of the data. Also in existing methods of machine learning, points must be assigned to a single model. This limits the ability of an algorithm to handle noise or properly classify points that are ambiguous in their location, especially when models are quite similar or have overlap. Furthermore, many machine learning algorithms operate with only a single type of model. Typically, the assumption is that the data fits a normal (Gaussian) distribution. This limits the ability of the algorithm to accurately classify points that come from other generating functions, such as linear relationships. Also, interaction and control of the algorithms is either extremely rigid (such as the above restrictions) or left to the programmer, not the expert analyst looking at the data.

In exemplary embodiments, in contrast to the above other algorithms, the algorithm for discovering mixtures of models within data and probabilistic classification of data according to the model mixture uses an abstraction of the model that includes a generating function (which underlies all the computations), a notion of the residual (or error) for a point, measures the support for a model among the input data. This enables direct comparisons of qualitatively different models and of different parameterizations of a single shape of model. Thus, there are no assumptions made about the number or shape of the models that should be found in the data set. The algorithm merely requires a user settable threshold for the amount of support there should be for a model in the input data, which in turn gives provides new features for how a user may interact with the computations, in regard to the amount of support and the maximum (or mean) residual error for points to be associated with a model.

In additional exemplary embodiments, an iterative approach using expectation maximization includes using initial guesses for the parameters, where expectation values for the membership values of each data point are computed; then estimates are computed for the distribution parameter (e.g. mean and variance for a Gaussian, or slope and intercept for a line). This is done in a way that maximizes the fit, which may be equivalently conceived as minimizing an error function.

Further exemplary embodiments include implementing Markov-chain Monte Carlo methods which deduce parameters by randomly assigning points to a particular model (an example of Monte Carlo sampling). The parameters are at first initial guesses, but are iteratively refined as points are assigned. Estimators then determine the quality of fit, and points that do not fit may be put back into the pool of points to be randomly assigned.

Additional exemplary embodiments, include implementation of spectral methods are based on Singular Value Decomposition of a matrix embodying the data points. This enables a projection of each point onto a linear subspace (singular vectors); in this space, points that are generated by different underlying distributions should be distant from each other.

In additional exemplary embodiments, a stand-alone program suitable for analysis and product testing is available. In further exemplary embodiments, the algorithm for discovering mixtures of models within data and probabilistic classification of data according to the model mixture is also useful as a tool incorporating all competing algorithms with radically faster (parallel) implementations. A method, system and program product including instructions implemented in a computer readable and computer executable program on a computer processor are described herein as discovering mixtures of models within data and probabilistic classification of data according to model mixtures.

Figure 5A:
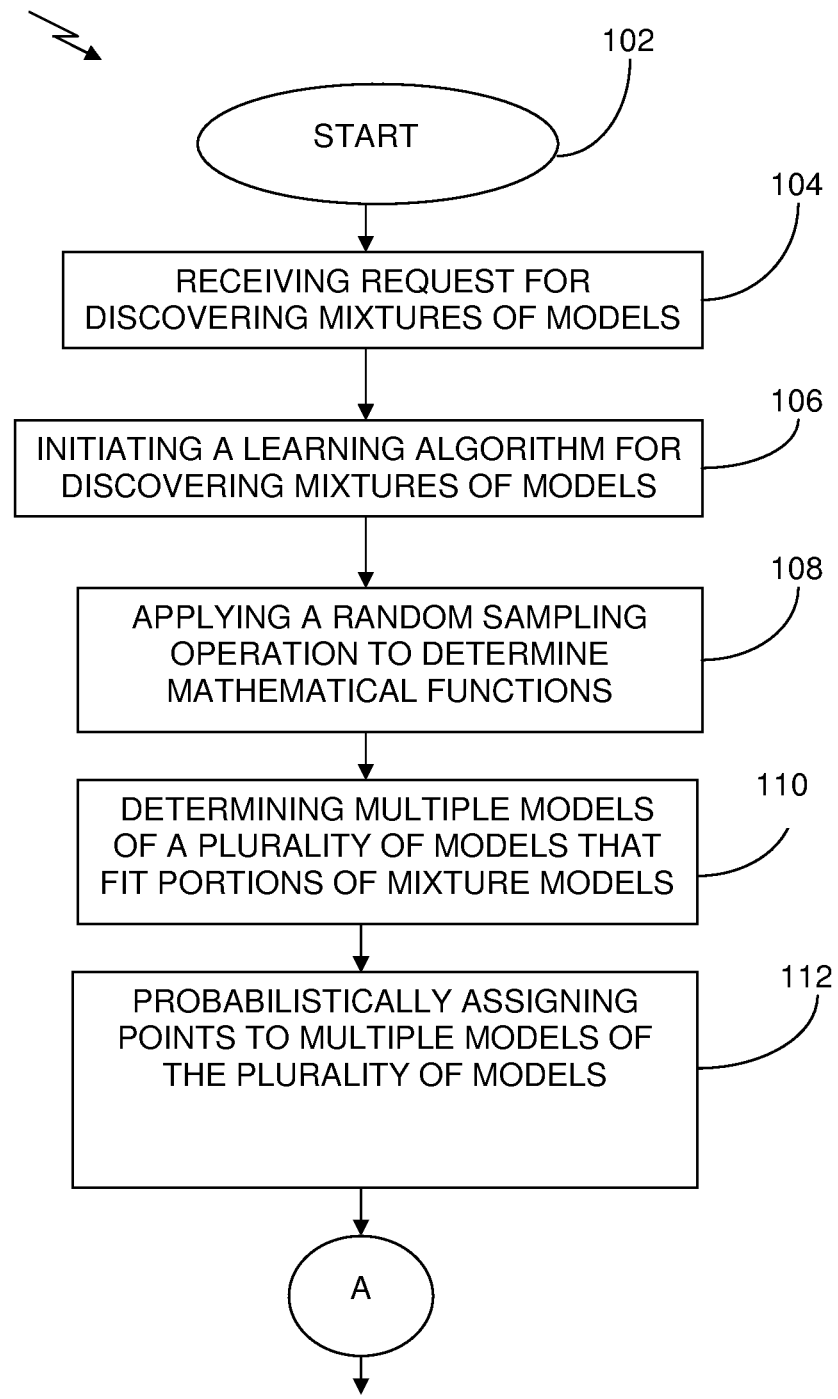
FIG. 5A illustrates a method 100 of discovering mixtures of models.
Figure 5B:
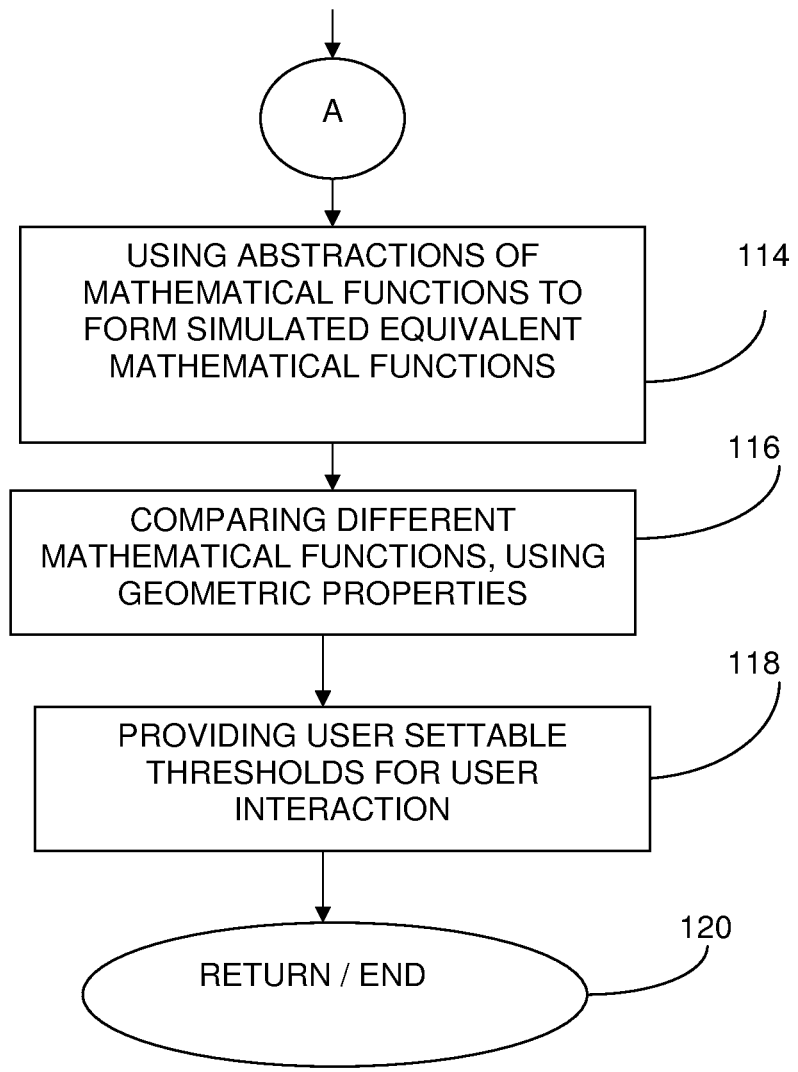
FIG. 5B illustrates a continuation of the method 100.
Figure 6:
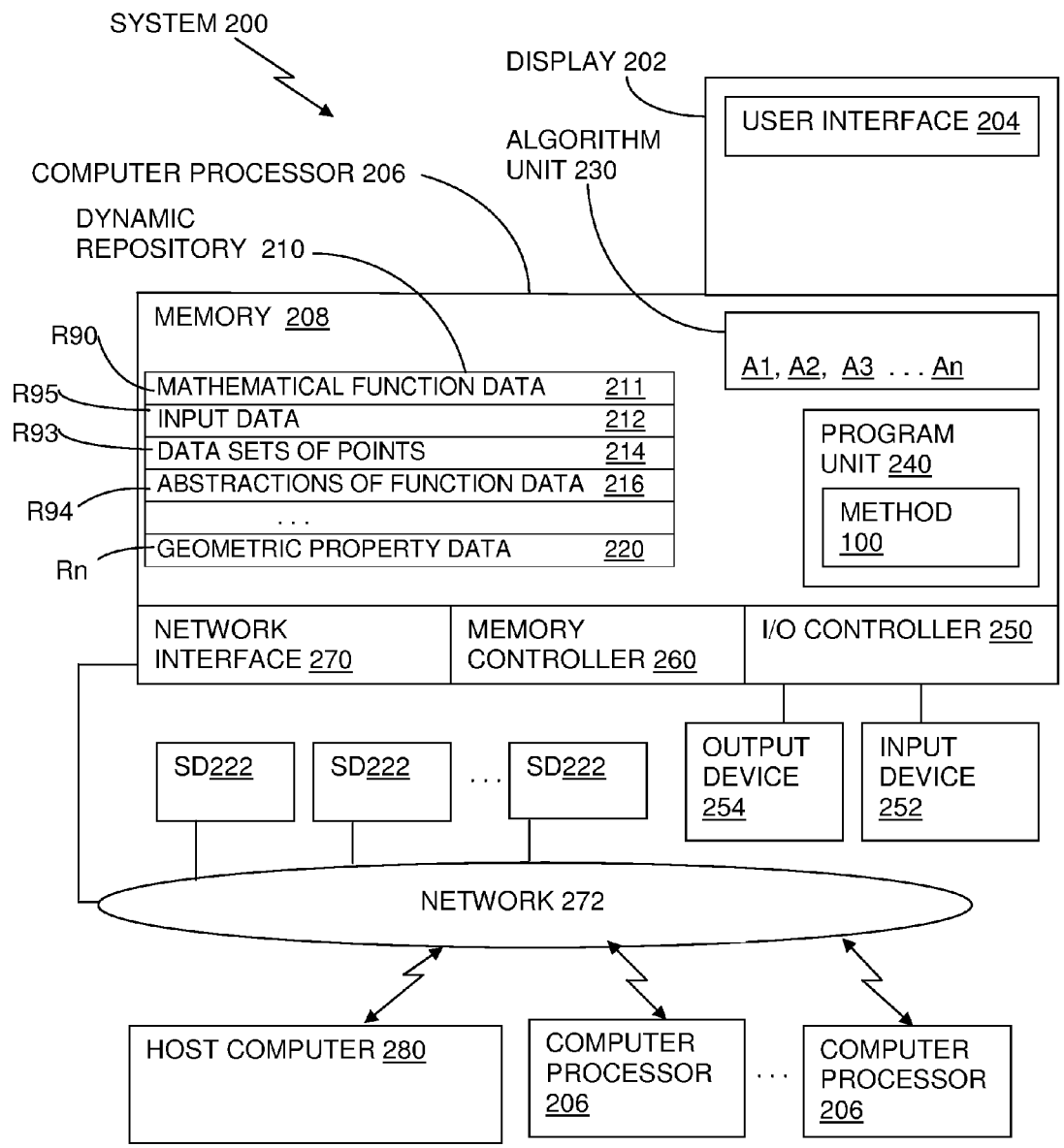
FIG. 6 illustrates a system 200 which implements the method 100.

Referring to FIG. 5A, FIG. 5B, and FIG. 6, in accordance with a first exemplary embodiment, a method 100 (hereafter the "method 100") is implemented in a computer readable and computer executable program executed on a computer system 200 (hereafter the "system 200"). The method 100 automatically discovers mixtures of models within data and probabilistic classification of data according to model mixtures.

Referring to FIG. 5A, FIG. 5B and FIG. 2, in accordance with the first exemplary embodiment, the system 200 embodies and implements the various methods, procedures, algorithms, instructions, operations and sub operations of the method 100 in the structure of computer executable program code, computer executable and computer readable media and other hardware, firmware and/or software modules, network applications, and interface platforms, upon which the method 100 can be carried out.

Referring again to FIG. 5A, FIG. 5B and FIG. 2, in accordance with the first exemplary embodiment, the system 200 includes a computer processor 206 (hereafter "the computer processor 206") communicatively coupled to and/or communicatively coupling either externally or residing inside of the computer processor 206 a plurality of network interface controllers, input/output controllers, input devices and output devices, such as a network interface 270, a memory controller 260, an input/output controller 250 (hereafter "the I/O controller 250"), an input device 252, an output device 254, and a display 202, where the display 202 displays a user interface 204. In exemplary embodiments, software application packages including special purpose algorithms or any other commercially available software application packages can be accessed and exercised interactively by a user using the computer processor 206, either locally or over a network 272.

Referring to FIG. 2, in accordance with exemplary embodiments, the network interface 270 communicatively connects the computer processor 206 to a network 272, where a plurality of client side, server side and/or user networked devices reside, interact and operate communicatively over the network 272. The network 272 can be a wide area communications network, including an Internet or an extranet or the network 272 can be a local area network, including an intranet. These networked devices and systems can include host computers, such as a host computer 280; these devices and systems can include storage devices, such as tape drives, disc drives operating individually or in storage library farms; in exemplary embodiments, a plurality of storage devices can include a device such as one or more of an SD222. These networked devices can also include a plurality of devices, such as the computer processor 206.

Again referring to FIG. 2, in accordance with exemplary embodiments, the input device 252 can be at least one or more of a mouse, a keyboard, a touch screen terminal, a light pen wand, a joystick, a thumbwheel, a copier system or machine, a hardcopy paper scanner system or machine, a microphone or an electronic and/or a radio frequency scanning device (including RFID) or biosensor input devices.

Figure 7A:
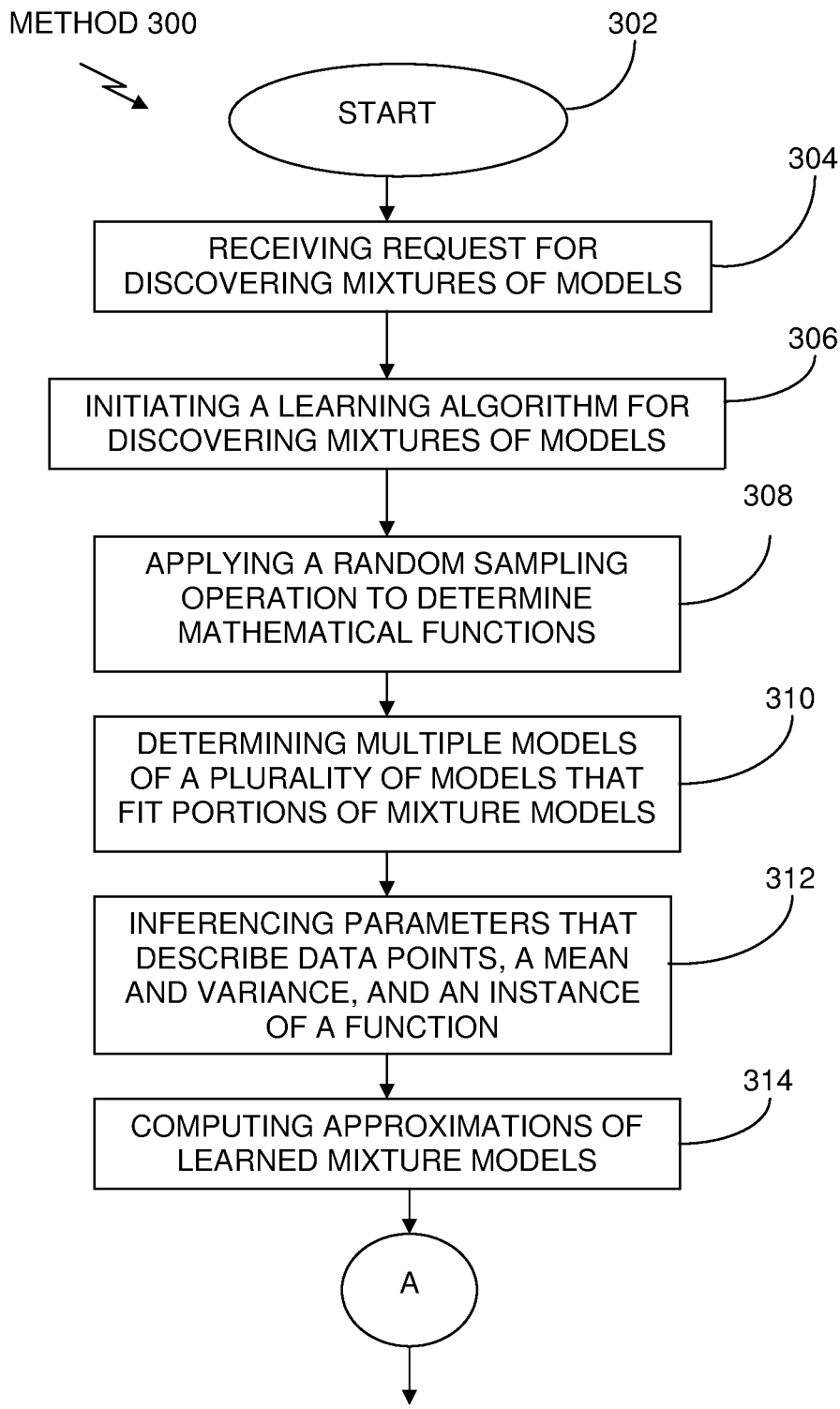
FIG. 7A illustrates a method 300 of discovering mixtures of models.
Figure 7B:
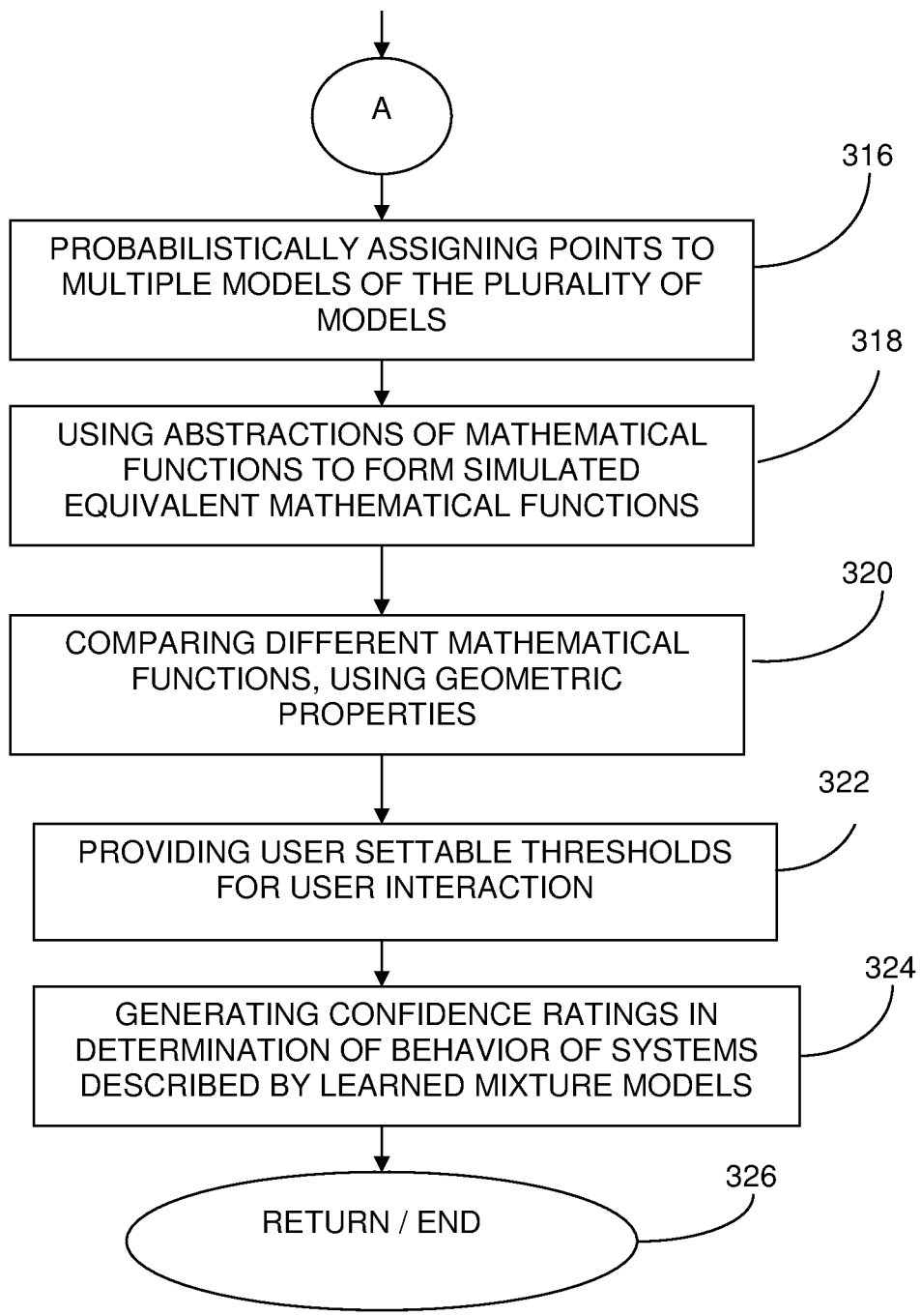
FIG. 7B illustrates a continuation of the method 300.
Figure 8:
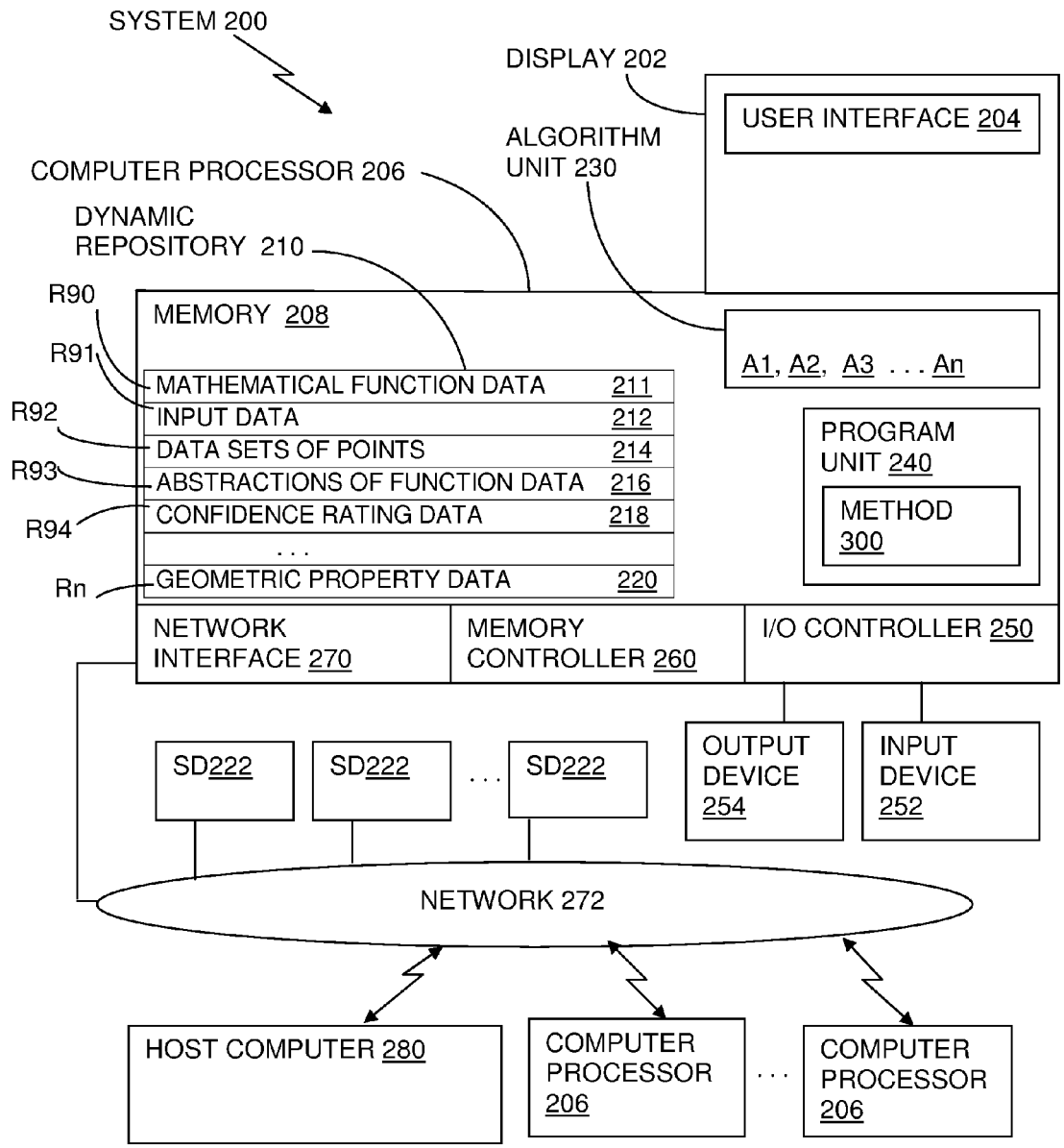
FIG. 8 illustrates a system 200 which implements the method 300.
Figure 9A:
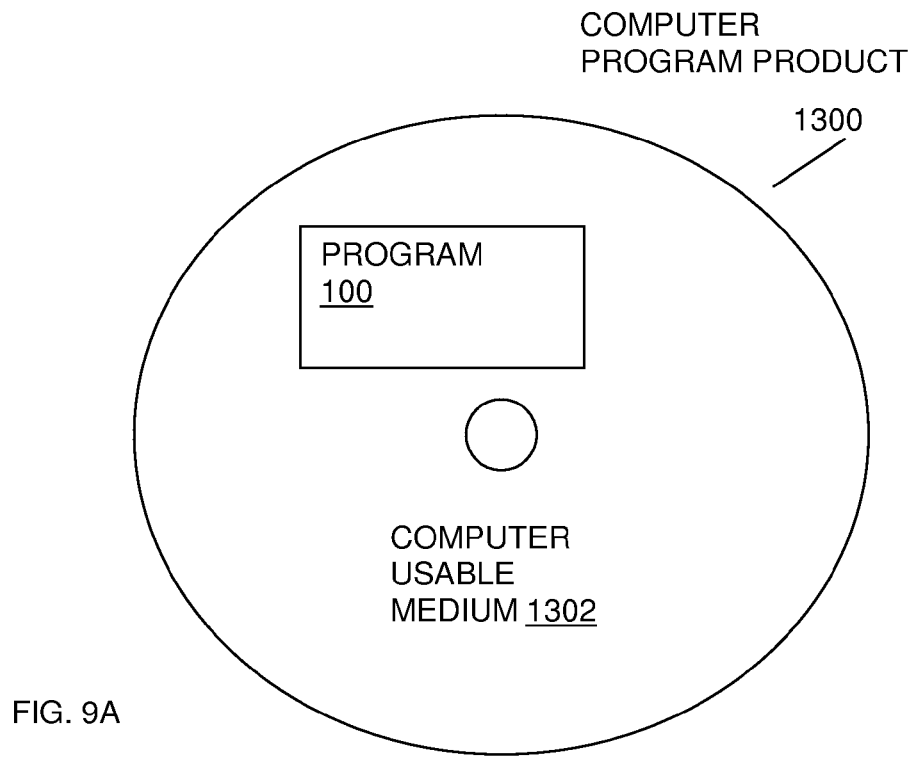
FIG. 9A illustrates a computer program product containing the method 100.
Figure 9B:
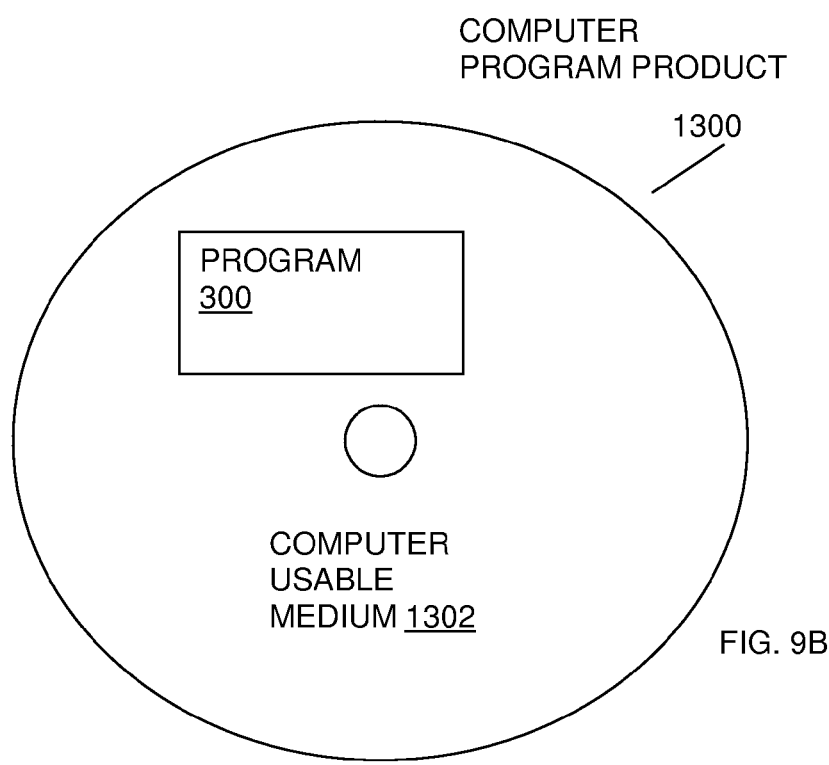
FIG. 9B illustrates a computer program product containing the method 300.

In exemplary embodiments, the system 200 and the method 100 illustrated in FIG. 2, FIG. 5A and FIG. 5B, and/or a method 300 as illustrated in FIG. 7A, FIG. 7B and FIG. 8 respectively, can be implemented in software, firmware and/or hardware or any combination of each. According to exemplary embodiments, the method 100 and/or the method 300 are implemented in software, as executable program code, which comprises an ordered listing of a plurality of computer executable instructions for implementing logical functions, and the method 100 and/or the method 300 is executed by either special or general purpose digital computers including a PDA, a personal computer, a workstation, a minicomputer or a mainframe computer.

In exemplary embodiments, the system(s) 200 can be implemented with a general purpose digital computer designated as the computer processor 206. The computer processor 206 is a hardware device for executing software implementing the method 100, as well as the method 300. The computer processor 206 can be any custom made or commercially available, off-the-shelf processor, a central processing unit (CPU), one or more auxiliary processors, a semiconductor based microprocessor, in the form of a microchip or chip set, a macroprocesssor or generally any device for executing software instructions. The system(s) 200 when implemented in hardware can include discrete logic circuits having logic gates for implementing logic functions upon data signals, or the system(s) 200 can include an application specific integrated circuit (ASIC).

Referring to FIG. 6 and FIG. 8, in accordance with exemplary embodiments, the computer processor 206 further includes a memory 208 (hereafter "the memory 208"). Residing in the memory 208 are a program unit 240 (hereafter "the program unit 240") and a dynamic repository 210 (hereafter "the dynamic repository 210"). Residing in the dynamic repository 210 are a plurality of repository entry locations R90, R91, R92, R93, R94, up to and including Rn, where Rn theoretically represents an infinite number of repository entry locations limited only by known physical and/or virtual memory capacity. Thus, each repository entry location R90 up to Rn can hold, store and/or save a plurality of information and/or data including data such as mathematical function data 211 (i.e., data representing models in the mixture), represented as being stored in repository entry location R90; input data 212, represented as being stored in repository entry location R91; data sets of points 214, stored and/or saved in repository entry location R92; abstractions of function data 216, held in repository entry location R93, and referring to FIG. 8, confidence rating data system data 218, stored in repository entry location R94 (see FIG. 8); and geometric property data 220, saved in representative repository entry location Rn. These groups of data and information can be easily and programmatically accessed and exercised by computer processor 206 to provide various solutions to discovering mixtures of models related problems, including mathematical calculations, analyses and determinations of user thresholds, generating confidence ratings and determining behavior of systems described by learned mixture models. In addition, a plurality of other data and information may be entered into the repository entry locations R90 through Rn; these groups of information and data, including the plurality of other data can be stored temporarily and/or permanently and/or semi permanently in the repository entry locations R90 through Rn or stored over the network 272 in any of the plurality of storage devices residing on and/or communicatively coupled to the network 272, including the SD222. In exemplary embodiments, these groups of information and data can be downloaded programmatically over the network 272 or entered manually by way of the input device 252.

Referring again to FIG. 6 and FIG. 8, in accordance with exemplary embodiments, the memory 208 further includes an algorithm unit 230. Residing in the algorithm unit 230, is a plurality of algorithms such as an algorithm A1, an algorithm A2, an algorithm A3 up to and including an algorithm An, where the algorithm An theoretically represents an infinite number of algorithms limited only by known physical and/or virtual memory capacity. In exemplary embodiments, algorithm A1 is a learning algorithm; Algorithm A2 can be one or more random sampling generation algorithms; and Algorithm A3 can be one or more abstractions generating algorithms. There can be a plurality of algorithms performing comparing operations, statistical operations and any number of other operations, including a classification algorithm, "decorrelated k-means" algorithm, a sum of parts algorithm, a prediction algorithm, a learning algorithm, a modeling algorithm. These algorithms can be in the form of one or more formulas, applets, programs, routines, sub routines, macro programs and/or micro programs and/or any combination of such programs, applets and formulas. In exemplary embodiments, these algorithms and/or formulas are represented as either individual segments of knowledge base applications which are called and/or executed to arrive at predictions determining and/or describing confidence ratings of points and corresponding determinations of behavior of systems described by learned mixture models and can be accomplished through the use of a plurality of agents or these algorithms and/or formulas exercised and combined with other data to perform routine computational tasks in regard to providing required data and determinations in the form of transforming raw data (by the use of learning algorithms) into behavior predictions. These algorithms and/or formulas are called by programmatic operations of the method 100 and/or the method 300, either automatically or manually by a user to perform computational and predictive tasks. Furthermore, these algorithms can be stored temporarily and/or permanently and/or semi permanently in the algorithm unit 230 or stored over the network 272 in any of the plurality of computers or storage devices, such as the SD222 or in a repository (such as the dynamic repository 210) in the computer processor 206 or in the host computer 280 or in any one or more of the computer processor 206. In exemplary embodiments, the plurality of algorithms and/or formulas can be downloaded programmatically over the network 272 or entered manually by way of the input device 252.

Referring to FIG. 6, FIG. 8, FIG. 9A and FIG. 9B, in accordance with exemplary embodiments, residing in the program unit 240 is a plurality of computer readable and computer executable media (such as a computer usable medium 1302) which contain a plurality of computer programs, or algorithms and/or software applications, composing operations, instructions and/or procedures of the method 100 and/or the method 300 encoded as computer readable and computer executable program code, contained in a computer program product 1300. In exemplary embodiments, software in the program unit 240 includes a suitable operating system.

In exemplary embodiments, referring to FIG. 6 and FIG. 8, the memory 208 and the dynamic repository 210 and the plurality of storage devices including such devices as the SD222 can include any one of or a combination of volatile memory elements, including random access memory (i.e., including RAM, DRAM, SRAM and/or SDRAM) and non-volatile memory elements including read only memory (i.e., ROM, erasable programmable read only memory, electronically erasable programmable read only memory EEPROM, programmable read only memory PROM, and/or compact disc read only memory CDROM or FLASH memory or cache) magnetic tape, disk, diskette, cartridge, cassette and/or optical memory. The memory 208 can have an architecture where various components are situated remotely from one another, but can be accessed by the computer processor 206, either directly and/or locally or logically through various communications buses or remotely over the network 272.

Referring to FIG. 5A and FIG. 6, in accordance with a first exemplary embodiment, at an operation start 102 (hereafter "the operation 102"), the system 200 receives a signal from an operator or an individual user via either the input device 252 or an automatic programmatic wake up signal from the computer processor 206, which activates and initiates the computer executable program code implementing the method 100. The method 100, upon activation, performs other operations from selection signals received in the computer processor 206 from the input device 252, causing the method 100 to be executed by the computer processor 206 and in turn causing the computer processor 206 to perform operations and procedures including calling algorithms and software applications and executing the instructions in the algorithms and applications including mathematical calculations, analyses and determinations of economic factors involving operations and sub operations of the method 100 for discovering mixtures of models within data and probabilistic classification of data according to model mixtures.

Referring to FIG. 5A and FIG. 6, in accordance with the first exemplary embodiment, at an operation receiving request for discovering mixtures of models 104 (hereafter "the operation 104"), the system 200 receives a signal from an operator or an individual user via the input device 252 from the computer processor 206, causing the computer processor 206 to perform operations and procedures including discovering mixtures of models within data and probabilistic classification of data according to model mixtures.

Referring again to FIG. 5A and FIG. 6, in accordance with the first exemplary embodiment, at an operation initiating a learning algorithm for discovering mixtures of models 106 (hereafter "the operation 106"), the program code of the method 100 executed by the computer processor 206 of the system 200 causes the computer processor 206 to execute the computer readable and executable program for simultaneously discovering mixtures of models within data and probabilistic classification of data according to mixture models of a plurality of models, by receiving an initiation request, from the computer executable program code of the method 100 requesting a determination and/or a prediction in regard to determining behavior of a system described by a learned mixture model. The request may be in the form of a signal from a local user or a remote user and/or operator and/or client sent from the remote user's and/or client computer system, transmitted over the network 272 and received by the computer processor 206 or the request may be input through the input device 252 by a user of the computer processor 206, after the local user (i.e., local to the computer processor 206) receives the request for discovering mixtures of models via some other media including voice or hardcopy paper, receipt of the request causes the computer processor 206 to automatically and/or programmatically execute the computer readable and executable program of the method 100 of initiating and/or calling a learning algorithm.

Referring to FIG. 5A, FIG. 6, in accordance with the first exemplary embodiment, at an operation applying a random sampling operation to determine mathematical functions 108 (hereafter "the operation 108"), in response to the user's request for discovering mixtures of models, the program code of the method 100 executed by the computer processor 206, causes the computer processor 206 to automatically perform operations of calling any one or more random sampling algorithms including PROGRESSIVE SAMPLE CONSENSUS (PROSAC), RANDOM SAMPLE CONSENSUS (RANSAC), and MARKOV CHAIN or MONTE CARLO methods, consistent with a dataset of a cluster of points in a first region of a domain and a set of points distributed near either a first line of a plurality of lines or a mathematical function, in a first region of a domain.

Referring to FIG. 5A and FIG. 6, in accordance with the first exemplary embodiment, at an operation determining multiple models of a plurality of models that fit portions of mixture models 110 (hereafter "the operation 110"), the program code of the method 100 executed by the computer processor 206, causes the computer processor 206 to determine multiple models of the plurality of models that fit portions of the dataset of the cluster of points and the set of points distributed near either the first line or the mathematical function in the first region of the domain.

Referring to FIG. 5A and FIG. 6, in accordance with the first exemplary embodiment, at an operation probabilistically assigning points to multiple models of the plurality of models 112 (hereafter "the operation 112"), the program code of the method 100 executed by the computer processor 206, causes the computer processor 206 to determining, by the computer processor 206, either when a data set (such as data sets of points 214) consists of a cluster of points in a first region of a domain, or determining when a set of points distributed near a first line that extends across part of the domain exists and/or determining when a set of points constitutes one of a transcendental, hyperbolic, polynomial, and other function, which is described as embedded in any number of dimensions that describe input data, such as input data 212.

Again referring to FIG. 5A and FIG. 6, in the operation 112 the computer processor 206 computes approximations of a first learned mixture model corresponding to the set of points distributed near the first function and a second learned mixture model corresponding to the set of points near the second function within the domain and similar approximations for functions determined to exist within data.

Referring to FIG. 5A, FIG. 5B and FIG. 6, in accordance with the first exemplary embodiment, at an operation using abstractions of mathematical functions to form simulated equivalent mathematical functions 114 (hereafter "the operation 114"), wherein the mathematical functions discussed in the operation 114 refer to mathematical functions such as the mathematical function data 211, the program code of the method 100 executed by the computer processor 206, causes the computer processor 206 to call one or algorithms from the algorithm unit 230 to perform operations of generating and or using abstractions of mathematical functions to form simulated equivalent mathematical functions, causing one or more mathematical functions to be processed by the method 100 as one or more of the plurality of models. These abstraction operations, as well as other operations, such as approximation operations and any other operations from the group of operations 104 through 118, as well as the operations 304 through 324 are useful in the performance of the operation of probabilistically assigning points to multiple models of the plurality of models 112. The operations discussed herein can be performed and iteratively revisited and exercised in any order or sequence and are not limited to any ordering arrangement of steps that might be assumed from review of the exemplary flow diagrams of the figures presented herewith.

Referring again to FIG. 5A, FIG. 5B and FIG. 6, in accordance with the first exemplary embodiment, at an operation comparing different mathematical functions, using geometric properties 116 (hereafter "the operation 116") wherein the geometric properties discussed in the operation 116 refer to geometric properties such as defined by the geometric property data 220, the program code of the method 100 executed by the computer processor 206, causes the computer processor 206 to compare different mathematical functions, by accessing geometric properties, such as geometric property data 220 residing in the dynamic repository 210, including geometric properties such as overlap, supporting point sets, and density.

Referring again to FIG. 5A, FIG. 5B and FIG. 6, in accordance with the first exemplary embodiment, at an operation providing user settable thresholds for user interaction 118 (hereafter "the operation 118"), the program code of the method 100 executed by the computer processor 206, causes the computer processor 206 to provide user accessible and user settable thresholds to the user via the user interface 204 of the display 202 in the system 200. These user settable thresholds relate to user interaction with the computations of the number of and associated residual error and corresponding and supporting point sets associated with the first and second learned mixture models. In exemplary embodiments, the algorithm for discovering mixtures of models within data and probabilistic classification of data according to the model mixture uses an abstraction of the model that includes a generating function (which underlies all the computations), a notion of the residual (or error) for a point, measures the support for a model among the input data. This enables direct comparisons of qualitatively different models and of different parameterizations of a single shape of model. Thus, there are no assumptions made about the number or shape of the models that should be found in the data set. The algorithm merely requires a user settable threshold for the amount of support there should be for a model in the input data, which in turn provides new features for how a user may interact with the computations, in regard to the amount of support and the maximum (or mean) residual error for points to be associated with a model.

Referring again to FIG. 5A, FIG. 5B and FIG. 6, in accordance with the first exemplary embodiment, at an operation return/end 120 (hereafter "the operation 120"), the program code of the method 100 executed by the computer processor 206, causes the computer processor 206 to automatically either return to any of the above operations 104 through 120 and iteratively perform any one or more of the operations until the discovering mixtures of models operations are completed. Or, the program code of the method 100 executed by the computer processor 206, causes the computer processor 206 to end when the program code of the method 100 receives an automatic signal generated by the system 200 or a signal from the user causing the operations to halt.

According to a second exemplary embodiment, referring to FIG. 7A and FIG. 8, at an operation start 302 (hereafter "the operation 302"), the system 200 receives a signal which activates and initiates the computer executable program code implementing the method 300. The method 300, upon activation, performs other operations from selection signals received in the computer processor 206 from the input device 252, causing the method 300 to be executed by the computer processor 206 and in turn causing the computer processor 206 to perform operations and procedures of the method 300 for discovering mixtures of models within data and probabilistic classification of data according to model mixtures.

Referring to FIG. 7A and FIG. 8, in accordance with the second exemplary embodiment, at an operation receiving request for discovering mixtures of models 304 (hereafter "the operation 304"), the system 200 receives a signal from an operator or an individual user via the input device 252 from the computer processor 206, causing the computer processor 206 to perform operations and procedures including discovering mixtures of models within data and probabilistic classification of data according to model mixtures.

Referring again to FIG. 7A and FIG. 8, in accordance with the second exemplary embodiment, at an operation initiating a learning algorithm for discovering mixtures of models 306 (hereafter "the operation 306"), the program code of the method 300 executed by the computer processor 206 of the system 200 causes the computer processor 206 to execute the computer readable and executable program for simultaneously discovering mixtures of models within data and probabilistic classification of data according to mixture models of a plurality of models, by receiving an initiation request, from the computer executable program code of the method 300 requesting a determination and/or a prediction in regard to determining behavior of a system described by a learned mixture model. The request may be in the form of a signal from a local user or a remote user and/or operator and/or client sent from the remote user's and/or client computer system, transmitted over the network 272 and received by the computer processor 206 or the request may be input through the input device 252 by a user of the computer processor 206, after the local user (i.e., local to the computer processor 206) receives the request for discovering mixtures of models via some other media including voice or hardcopy paper, receipt of the request causes the computer processor 206 to automatically and/or programmatically execute the computer readable and executable program of the method 300 of initiating and/or calling a learning algorithm.

Referring to FIG. 7A, FIG. 8, in accordance with the second exemplary embodiment, at an operation applying a random sampling operation to determine mathematical functions 308 (hereafter "the operation 308"), in response to the user's request for discovering mixtures of models, the program code of the method 300 executed by the computer processor 206, causes the computer processor 206 to automatically perform operations of calling any one or more random sampling algorithms including PROGRESSIVE SAMPLE CONSENSUS (PROSAC), RANDOM SAMPLE CONSENSUS (RANSAC), and MARKOV CHAIN or MONTE CARLO methods, consistent with a dataset of a cluster of points in a first region of a domain and a set of points distributed near either a first line of a plurality of lines or a mathematical function, in a first region of a domain.

Referring to FIG. 7A and FIG. 8, in accordance with the second exemplary embodiment, at an operation determining multiple models of a plurality of models that fit portions of mixture models 310 (hereafter "the operation 310"), the program code of the method 300 executed by the computer processor 206, causes the computer processor 206 to determine multiple models of the plurality of models that fit portions of the dataset of the cluster of points and the set of points distributed near either the first line or the mathematical function in the first region of the domain.

Referring to FIG. 7A and FIG. 8, in accordance with the second exemplary embodiment, at an operation inferencing parameters that describe data points, a mean and variance, and an instance of a function 312 (hereafter "the operation 312"), the program code of the method 300 executed by the computer processor 206, causes the computer processor 206 to inference parameters of the first line that either describe the set of points distributed near the first line, or describe a means and variance of the cluster of points in the first region of the domain creating a description of the cluster of points in the first region of the domain, and describe other parameters needed to describe an instance of a function in a number of dimensions, where the function is a mathematical function such as represented by mathematical function data 211.

Referring again to FIG. 7A and FIG. 8, in accordance with the second exemplary embodiment, at an operation computing approximations of learned mixture models 314 (hereafter "the operation 314"), the program code of the method 300 executed by the computer processor 206, causes the computer processor 206 to compute approximations of a first learned mixture model corresponding to the set of points distributed near the first function and a second learned mixture model corresponding to the set of points near the second function within the domain and similar approximations for functions determined to exist within data.

In exemplary embodiments, an object oriented approach is taken approach to design a model. Fundamental operations identified were construction of a model from a list of points and the computation of residual error for a point, given the model parameters. This approach provides a way to build a model with a randomly selected set of data points and to compute an optimal approximation, such as computation of a least squares optimal approximation or some other known optimal approximation paradigm, according to standard mathematical practices, from a set of points identified as probabilistically belonging with that model, and re-compute the residuals for all points. The computation of a residual has a somewhat different meaning for every class of function, but for many functions the computation of a residual is merely an abstraction of a distance function with geometric meaning in the space. For functions such as Gaussians, the natural residual associated with such a function (the Z-score) is a convenient implementation. Implicitly, there is a metric for whether a particular value of the residual is deemed sufficiently close to an instance to warrant inclusion. Thus, every function must have a way—given access to the input data—to build a random instance of itself, compute residuals to its current instance, evaluate which points are worthy of further consideration, build optimal approximations from those points.

Referring to FIG. 7A, FIG. 7B and FIG. 8, in accordance with the second exemplary embodiment, at an operation probabilistically assigning points to multiple models of the plurality of models 316 (hereafter "the operation 316"), the program code of the method 300 executed by the computer processor 206, causes the computer processor 206 to determine, by the computer processor 206, either when a data set (such as data sets of points 214) consists of a cluster of points in a first region of a domain, or determine when a set of points distributed near a first line that extends across part of the domain exists and/or determine when a set of points constitutes one of a transcendental, hyperbolic, polynomial, and other function, which is described as embedded in any number of dimensions that describe input data, such as input data 212.

The operation 316 is performed by further determining a first probability that the first learned mixture model corresponds to each point of the cluster of points in the first region of the domain and determining a second probability that the second learned mixture model corresponds to each point of the set of points distributed near the first line. The determining of the first and second probabilities is performed by testing each point. The determining of the first and second probabilities eliminates a requirement for a fit of each point displaced from a true position. Setting a minimum number of points for each of the first and second learned mixture models distinguishes the first and second learned mixture models from a combination learned mixture model formed from parameters of the first and second learned mixture models. The determining of the first and second probabilities includes assigning a fixed percent probability up to about fifty percent for points of a line, depending on a residual error fit of the first and second learned mixture model, and where the learning algorithm probabilistically determines whether a series of Gaussian mixture models are found, by combining a number of points of the first and second learned mixture models with an average residual points to be excluded and repeating probabilistically assigning points to multiple models of the plurality of models for each function determined to exist within data.

In exemplary embodiments, an iterative approach using expectation maximization includes using initial guesses for the parameters, where expectation values for the membership values of each data point are computed; then estimates are computed for the distribution parameter (e.g. mean and variance for a Gaussian, or slope and intercept for a line). This is done in a way that maximizes the fit, which may be equivalently conceived as minimizing an error function.

Referring again to FIG. 7A, FIG. 7B and FIG. 8, in accordance with the second exemplary embodiment, at an operation using abstractions of mathematical functions to form simulated equivalent mathematical functions 318 (hereafter "the operation 318"), the program code of the method 300 executed by the computer processor 206, causes the computer processor 206 to call algorithms from the algorithm unit 230 to perform operations of generating and or using abstractions of mathematical functions to form simulated equivalent mathematical functions, causing one or more mathematical functions to be processed by the method 300 as one or more of the plurality of models. In exemplary embodiments, in contrast to the above other algorithms, the algorithm for discovering mixtures of models within data and probabilistic classification of data according to the model mixture uses an abstraction of the model that includes a generating function (which underlies all the computations), a notion of the residual (or error) for a point, measures the support for a model among the input data. This enables direct comparisons of qualitatively different models and of different parameterizations of a single shape of model. Thus, there are no assumptions made about the number or shape of the models that should be found in the data set. The algorithm merely requires a user settable threshold for the amount of support there should be for a model in the input data, which in turn provides new features for how a user may interact with the computations, in regard to the amount of support and the maximum (or mean) residual error for points to be associated with a model.

Referring to FIG. 7A, FIG. 7B and FIG. 8, in accordance with the second exemplary embodiment, at an operation comparing different mathematical functions, using geometric properties 320 (hereafter "the operation 320"), the program code of the method 300 executed by the computer processor 206, causes the computer processor 206 to compare different mathematical functions, by accessing geometric properties, such as geometric property data 220 residing in the dynamic repository 210, including geometric properties such as overlap, supporting point sets, and density.

Referring again to FIG. 7A, FIG. 7B and FIG. 8, in accordance with the second exemplary embodiment, at an operation providing user settable thresholds for user interaction 322 (hereafter "the operation 322"), the program code of the method 300 executed by the computer processor 206, causes the computer processor 206 to provide user accessible and user settable thresholds to the user via the user interface 204 of the display 202 in the system 200. These user settable thresholds relate to user interaction with the computations of the number of and associated residual error and corresponding and supporting point sets associated with the first and second learned mixture models.

Referring to FIG. 7A, FIG. 7B and FIG. 8, in accordance with the second exemplary embodiment, at an operation generating confidence ratings in determination of behavior of systems described by learned mixture models 324 (hereafter "the operation 324"), the program code of the method 300 executed by the computer processor 206, causes the computer processor 206 to generate a confidence rating that each point of the cluster of points in the first region of the domain corresponds to the first learned mixture model and generate a confidence rating that each point of the cluster of points in the first region of the domain correspond to the second learned mixture model and thus, cause determination of a behavior of a system described by the learned mixture models. In exemplary embodiments, when a data set consists of a cluster of points in one region of a domain, and a set of points distributed near a line that extends across the domain. A mixture model would operate to discover the best parameters of the line that would describe the latter points and the mean and variance of the cluster to describe the former points. Since in a general data set, these points will have displacement from true positions due to noise, and there will in general be noisy points that do not appear to fit either of these models, best fit approximations to the models must be computed. Then, each point may be tested against the two models to determine the probability that each model could be the underlying mechanism that generated that point. This gives a confidence rating that a point belongs to each learned model.

Referring again to FIG. 7A, FIG. 7B and FIG. 8, in accordance with the second exemplary embodiment, at an operation return/end 326 (hereafter "the operation 326"), the program code of the method 300 executed by the computer processor 206, causes the computer processor 206 to automatically either return to any of the above operations 104 through 120 and iteratively perform any one or more of the operations until the discovering mixtures of models operations are completed. Or, the program code of the method 300 executed by the computer processor 206, causes the computer processor 206 to end when the program code of the method 100 receives an automatic signal generated by the system 200 or a signal from the user causing the operations to halt. While the disclosure has been described with reference to exemplary embodiments, it will be understood by those skilled in the art that various changes can optionally be made and equivalents can be substituted for elements thereof without departing from the scope of the disclosure. In addition, many modifications can be made to adapt a particular situation or material to the teachings of the disclosure without departing from the essential scope thereof. Therefore, it is intended that the disclosure not be limited to the particular exemplary embodiment or embodiments disclosed herein as the best mode contemplated for carrying out this disclosure, but that the disclosure will include all embodiments falling within the scope of the appended claims.

All references cited herein, including issued U.S. patents, or any other references, are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

What is claimed is:

1. A method, implemented in a computer readable and executable program on a computer processor, of discovering mixtures of models within data and probabilistic classification of data according to model mixtures, the method comprising:

receiving, a request for discovering mixtures of models within data and probabilistic classification of data according to model mixtures;

initiating a learning algorithm, by the computer processor, causing the computer processor to execute the computer readable and executable program for simultaneously discovering mixtures of models within data and probabilistic classification of data according to mixture models of a plurality of models;

applying a random sampling operation to determine mathematical functions;

determining multiple models of the plurality of models that fit portions of mixture models of the plurality of models;

probabilistically assigning points to multiple models of the plurality of models by using abstractions of mathematical functions to form simulated equivalent mathematical functions, causing one or more mathematical functions to be processed as one or more of the plurality of models;

comparing multiple models of the plurality of models by comparing different mathematical functions and by comparing a first quality of a first model to a second quality of a second model, wherein a number of points supporting an at least one candidate model are counted to determine whether sufficient data are modeled, wherein global accounting ensures that the number of points supporting the at least one candidate model are only counted once, when determining how many of the number of points in data are modeled by candidate functions, and wherein comparing different mathematical functions includes using geometric properties, including overlap, the number of points supporting the at least one candidate model counted, and density; and providing user settable thresholds for user interaction with computations of residual error and with computations of the number of points supporting the at least one candidate model corresponding to learned mixture models.

2. The method according to claim 1, wherein probabilistically assigning points to multiple models of the plurality of models includes generating a confidence rating that each point of a cluster of points in the first region of the domain corresponds to the first learned mixture model and generating a confidence rating that each point of the cluster of points in the first region of the domain correspond to the second learned mixture model and causing determination of a behavior of a system described by the learned mixture models.

3. The method according to claim 1, wherein the random sampling operation includes one of PROGRESSIVE SAMPLE CONSENSUS (PROSAC), RANDOM SAMPLE CONSENSUS (RANSAC), and MONTE CARLO operations.

4. The method according to claim 3, wherein applying the random sampling operation to determine mathematical functions determines mathematical functions consistent with a dataset of a cluster of points in a first region of a domain and a set of points distributed near one of a first line and a mathematical function, in the first region of the domain.

5. The method according to claim 4, wherein the mathematical function includes a transcendental function, a hyperbolic function and a polynomial function.

6. A system of discovering mixtures of models within data and probabilistic classification of data according to model mixtures, the system comprising:

a computer processor having a display, an input device and an output device;

a network interface communicatively coupling the computer processor to a network; and a memory having a dynamic repository, an algorithm unit and a program unit containing a computer readable and computer executable program; and a memory controller communicatively coupling the computer processor with contents of the dynamic repository, the algorithm unit and the computer readable and computer executable program residing in the program unit, wherein when executed by the computer processor, the computer readable and computer executable program causes the computer processor to perform operations of discovering mixtures of models including operations of:
receiving, a request for discovering mixtures of models within data and probabilistic classification of data according to model mixtures;
initiating a learning algorithm, by the computer processor, causing the computer processor to execute the computer readable and executable program discovering mixtures of models within data and probabilistic classification of data according to mixture models;
applying a random sampling operation to determine mathematical functions;
determining, by the computer processor, one of when a data set consists of a cluster of points in a first region of a domain, and determining when a set of points distributed near a first line that extends across part of the domain exists;
inferencing parameters, of the first line, that one of describe the set of points distributed near the first line, and describe a mean and variance of the cluster of points in the first region of the domain creating a description of the cluster of points in the first region of the domain, and describe other parameters needed to describe an instance of a function in a number of dimensions, wherein the number of dimensions includes 4D and higher dimensions;
computing, by the computer processor, approximations of a first learned mixture model corresponding to the set of points distributed near the first function and a second learned mixture model corresponding to the set of points near the second function within the domain and similar approximations for functions determined to exist within data;
probabilistically assigning points to multiple models of the plurality of models;
using abstractions of mathematical functions to form simulated equivalent mathematical functions, causing one or more mathematical functions to be processed as one or more of the plurality of models;
comparing multiple models of the plurality of models by comparing different mathematical functions and by comparing a first quality of a first model to a second quality of a second model, wherein a number of points supporting an at least one candidate model are counted to determine whether sufficient data are modeled, wherein global accounting ensures that the number of points supporting the at least one candidate model are only counted once, when determining how many of the number of points in data are modeled by candidate functions, and wherein comparing different mathematical functions includes using geometric properties, including overlap, the number of points supporting the at least one candidate model counted, and density;
providing user settable thresholds for user interactions with computations of residual error and with computations of the number of points supporting the at least one candidate model corresponding to the first and second learned mixture models; and
generating a confidence rating that each point of the cluster of points in the first region of the domain corresponds to the first learned mixture model and generating a confidence rating that each point of the cluster of points in the first region of the domain corresponds to the second learned mixture model and causing determination of a behavior of a system described by the first and second learned mixture models.

7. The system according to claim 6, having the computer processor performing operations of discovering mixtures by performing operations of determining, wherein determining, by the computer processor, further includes determining when a set of points constitutes a transcendental function, a hyperbolic function, a polynomial function, and other functions, described as embedded in any number of dimensions that describe input data.

8. The system according to claim 6, having the computer processor performing operations of discovering mixtures by performing operations of probabilistically assigning points to multiple models of the plurality of models, wherein probabilistically assigning points, by the computer processor, further includes: determining a first probability that the first learned mixture model corresponds to each point of the cluster of points in the first region of the domain and determining a second probability that the second learned mixture model corresponds to each point of the set of points distributed near the first line, wherein determining the first and second probabilities is performed by testing each point, wherein determining the first and second probabilities eliminates a requirement for a fit of each point displaced from a true position, wherein setting a minimum number of points for each of the first and second learned mixture models distinguishes the first and second learned mixture models from a combination learned mixture model formed from parameters of the first and second learned mixture models, wherein determining the first and second probabilities includes assigning a fixed percent probability up to about fifty percent for points of a line, depending on a residual error fit of the first and second learned mixture model, and wherein the learning algorithm probabilistically determines whether a series of Gaussian mixture models are found, by combining a number of points of the first and second learned mixture models with an average residual points to be excluded and repeating probabilistically assigning points to multiple models of the plurality of models for each function determined to exist within data.

9. The system according to claim 6, having the computer processor applying a random sampling operation to determine mathematical functions, wherein the random sampling operation includes one of PROGRESSIVE SAMPLE CONSENSUS (PROSAC), RANDOM SAMPLE CONSENSUS (RANSAC), and MONTE CARLO operations.

10. The system according to claim 9, having the computer processor applying the random sampling operation, determining mathematical functions, further causes determining mathematical functions consistent with a dataset of a cluster of points in a first region of a domain and a set of points distributed near one of a first line and a mathematical function, in the first region of the domain.

11. A non-transitory computer readable medium having a plurality of computer executable instructions in the form of a computer readable and computer executable program executed by a computer processor causing the computer processor to perform a method of discovering mixtures of models within data and probabilistic classification of data according to model mixtures, the plurality of computer executable instructions including:
instructions causing receiving, a request for discovering mixtures of models within data and probabilistic classification of data according to model mixtures, wherein the non-transitory computer readable medium includes a plurality of non-transitory computer readable data storage media including storage devices, such as tape drives and disc drives;

instructions initiating a learning algorithm, by the computer processor;

instructions for applying a random sampling operation to determine mathematical functions;

instructions causing determining, by the computer processor, one of when a data set consists of a cluster of points in a first region of a domain, determining when a set of points distributed near a first line that extends across part of the domain exists;

instructions causing inferencing parameters, of the first line, that one of describe the set of points distributed near the first line, and describe a mean and variance of the cluster of points in the first region of the domain creating a description of the cluster of points in the first region of the domain, and describe other parameters needed to describe an instance of a function in a plurality of dimensions;

instructions causing computing, by the computer processor, approximations of a first learned mixture model corresponding to the set of points distributed near a first function and a second learned mixture model corresponding to the set of points near a second function within the domain and similar approximations for functions determined to exist within data embedded in any subspace of the domain and total domain;

instructions causing probabilistically assigning points to multiple models of a plurality of models;

instructions for using abstractions of mathematical functions to form simulated equivalent mathematical functions, causing one or more mathematical functions to be processed as one or more of the plurality of models;

instructions causing comparing multiple models of the plurality of models by comparing different mathematical functions and by comparing a first quality of a first model to a second quality of a second model, wherein a number of points supporting an at least one candidate model are counted to determine whether sufficient data are modeled, wherein global accounting ensures that the number of points supporting the at least one candidate model are only counted once, when determining how many of the number of points in data are modeled by candidate functions, and wherein comparing different mathematical functions includes using geometric properties, including overlap, the number of points supporting the at least one candidate model counted, and density;

instructions for providing a user settable threshold for user interaction with computations residual error and with computations of the number of points supporting the at least one candidate model corresponding to the first and second learned mixture models; and instructions for generating a confidence rating that each point of the cluster of points in the first region of the domain corresponds to the first learned mixture model and generating a confidence rating that each point of the cluster of points in the first region of the domain correspond to the second learned mixture model and causing determination of a behavior of a system described by the learned mixture models.

12. The instructions of the non-transitory computer readable medium according to claim 11, initiating a learning algorithm, by the computer processor, further include instructions causing the computer processor to execute the computer readable and executable program discovering mixtures of models within data and probabilistic classification of data according to mixture models.

13. The instructions of the non-transitory computer readable medium according to claim 11, causing determining, by the computer processor, one of when a data set consists of a cluster of points in a first region of a domain, determining when a set of points distributed near a first line that extends across part of the domain exists, includes further instructions causing determining when a set of points constitutes one of a transcendental, hyperbolic, polynomial, and other function, which is described as embedded in any number of dimensions that describe input data, wherein any number of dimensions includes 4D and higher dimensions.

14. The instructions of the non-transitory computer readable medium according to claim 11, causing instructions for probabilistically assigning points to multiple models of the plurality of models, further includes instructions causing: determining a first probability that the first learned mixture model corresponds to each point of the cluster of points in the first region of the domain and determining a second probability that the second learned mixture model corresponds to each point of the set of points distributed near the first line, wherein determining the first and second probabilities is performed by testing each point, wherein determining the first and second probabilities eliminates a requirement for a fit of each point displaced from a true position, wherein setting a minimum number of points for each of the first and second learned mixture models distinguishes the first and second learned mixture models from a combination learned mixture model formed from parameters of the first and second learned mixture models, wherein determining the first and second probabilities includes assigning a fixed percent probability up to about fifty percent for points of a line, depending on a residual error fit of the first and second learned mixture model, and wherein the learning algorithm probabilistically determines whether a series of Gaussian mixture models are found, by combining a number of points of the first and second learned mixture models with an average residual points to be excluded and repeating probabilistically assigning points to multiple models of the plurality of models for each function determined to exist within data.

15. The instructions of the non-transitory computer readable medium according to claim 11, of applying a random sampling operation to determine mathematical functions, further includes instructions calling an algorithm to perform one of PROGRESSIVE SAMPLE CONSENSUS (PROSAC), RANDOM SAMPLE CONSENSUS (RANSAC), and MONTE CARLO operations.

16. The instructions of the non-transitory computer readable medium according to claim 15, wherein applying the random sampling operation to determine mathematical functions determines mathematical functions consistent with a dataset of a cluster of points in a first region of a domain and a set of points distributed near one of a first line and a mathematical function, in the first region of the domain.

* * * * *